US011829121B2

(12) United States Patent
Stump et al.

(10) Patent No.: US 11,829,121 B2
(45) Date of Patent: Nov. 28, 2023

(54) VIRTUAL DESIGN ENVIRONMENT

(71) Applicant: Rockwell Automation Technologies, Inc., Mayfield Heights, OH (US)

(72) Inventors: Andrew R Stump, Mentor, OH (US); Anthony Carrara, Strongsville, OH (US); Eashwer Srinivasan, Fremont, CA (US); Christopher W Como, Chagrin Falls, OH (US); Sharon M Billi-Duran, Euclid, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/842,871

(22) Filed: Jun. 17, 2022

(65) Prior Publication Data
US 2022/0334562 A1    Oct. 20, 2022

Related U.S. Application Data

(63) Continuation of application No. 16/584,210, filed on Sep. 26, 2019, now Pat. No. 11,392,112.

(51) Int. Cl.
*G05B 19/41* (2006.01)
*G05B 15/02* (2006.01)
(Continued)

(52) U.S. Cl.
CPC ....... *G05B 19/4185* (2013.01); *G02B 27/017* (2013.01); *G05B 15/02* (2013.01);
(Continued)

(58) Field of Classification Search
None
See application file for complete search history.

(56) References Cited

U.S. PATENT DOCUMENTS

| 5,526,522 A | 11/1996 | Takeuchi |
|---|---|---|
| 6,516,451 B1 | 2/2003 | Patin |

(Continued)

FOREIGN PATENT DOCUMENTS

| CN | 105159656 A | 12/2015 |
|---|---|---|
| CN | 107463147 A | 12/2017 |

(Continued)

OTHER PUBLICATIONS

Weyrich et al., "An interactive environment for virtual manufacturing: the virtual workbench", 1999, Computers in Industry 38, May 15, 1999. (Year: 1999).*

(Continued)

*Primary Examiner* — Mohammad Ali
*Assistant Examiner* — Kelvin Booker
(74) *Attorney, Agent, or Firm* — Amin, Turocy & Watson, LLP

(57) ABSTRACT

An industrial integrated development environment (IDE) supports a virtual design environment that allows an automation system designer to perform project development via interaction with a virtual reality presentation of the plant facility. The industrial design environment can generate system project data for an automation project—including but not limited to device selections, industrial control programming, device configurations, visualizations, engineering drawings, etc. —based on the developer's manual interactions with the virtual reality presentation. These interactions can include, for example, placing and moving machines or other industrial assets within the virtualized environment, defining trajectories of motion devices or robots using manual gestures, or other such interactive input. The IDE system interprets the developer's interactions as design specifications for the automation system being designed and translates these interactions into control code, (Continued)

visualizations, device configurations, and other system aspects that satisfy the design specifications.

20 Claims, 17 Drawing Sheets

(51) Int. Cl.
*G05B 19/04* (2006.01)
*G02B 27/01* (2006.01)
*G06F 3/01* (2006.01)
*G06Q 10/06* (2023.01)
*G05B 19/418* (2006.01)
*G05B 19/042* (2006.01)
*G06T 19/00* (2011.01)

(52) U.S. Cl.
CPC .......... *G05B 19/0426* (2013.01); *G06F 3/011* (2013.01); *G06F 3/017* (2013.01); *G06Q 10/06* (2013.01); *G06T 19/006* (2013.01)

(56) References Cited

U.S. PATENT DOCUMENTS

| | | | |
|---|---|---|---|
| 6,993,745 B1 | 1/2006 | Ballantyne et al. | |
| 7,313,609 B1 | 12/2007 | Wischinski | |
| 7,839,416 B2 * | 11/2010 | Ebensberger | G09B 11/10 |
| | | | 345/592 |
| 8,667,456 B1 | 3/2014 | Czymontek | |
| 8,812,684 B1 | 8/2014 | Hood et al. | |
| 9,223,567 B2 | 12/2015 | DeLuca et al. | |
| 10,372,107 B2 | 8/2019 | Majewski et al. | |
| 10,388,075 B2 * | 8/2019 | Schmirler | G06F 3/147 |
| 10,503,632 B1 | 12/2019 | Sivanantham et al. | |
| 10,559,043 B1 | 2/2020 | Schlintl | |
| 10,606,576 B1 | 3/2020 | Tung et al. | |
| 10,761,810 B2 | 9/2020 | Ramakrishna et al. | |
| 10,832,187 B2 | 11/2020 | Sharma et al. | |
| 10,936,807 B1 | 3/2021 | Walters et al. | |
| 11,048,500 B2 | 6/2021 | Grant et al. | |
| 11,087,053 B1 | 8/2021 | Sha et al. | |
| 11,107,236 B2 | 8/2021 | Hansson | |
| 2002/0004804 A1 | 1/2002 | Muenzel | |
| 2002/0191023 A1 | 12/2002 | Chandhoke et al. | |
| 2003/0009250 A1 | 1/2003 | Resnick et al. | |
| 2003/0028364 A1 | 2/2003 | Chan et al. | |
| 2004/0073404 A1 | 4/2004 | Brooks et al. | |
| 2004/0088688 A1 | 5/2004 | Hejlsberg et al. | |
| 2005/0257203 A1 | 11/2005 | Nattinger | |
| 2005/0268288 A1 | 12/2005 | Nattinger | |
| 2006/0041440 A1 | 2/2006 | Cheng et al. | |
| 2006/0224534 A1 | 10/2006 | Tartman et al. | |
| 2007/0016309 A1 | 1/2007 | Mckelvey et al. | |
| 2007/0209038 A1 | 9/2007 | Fuchs et al. | |
| 2007/0282766 A1 | 12/2007 | Hartman et al. | |
| 2008/0022259 A1 | 1/2008 | Macklem et al. | |
| 2008/0092131 A1 | 4/2008 | Mcintyre et al. | |
| 2008/0163344 A1 * | 7/2008 | Yang | G06Q 30/0201 |
| | | | 705/7.29 |
| 2008/0235166 A1 | 9/2008 | Sayyar-Rodsari et al. | |
| 2008/0288931 A1 | 11/2008 | Kohli | |
| 2009/0064103 A1 | 3/2009 | Shih | |
| 2009/0083649 A1 | 3/2009 | Baier et al. | |
| 2009/0088875 A1 | 4/2009 | Baier et al. | |
| 2009/0089225 A1 | 4/2009 | Baier et al. | |
| 2009/0089234 A1 | 4/2009 | Sturrock et al. | |
| 2009/0276752 A1 | 11/2009 | Sharma | |
| 2010/0082133 A1 | 4/2010 | Chouinard et al. | |
| 2010/0241891 A1 | 9/2010 | Beasley | |
| 2010/0269094 A1 | 10/2010 | Levenshteyn et al. | |
| 2010/0293481 A1 | 11/2010 | Austin | |
| 2011/0239198 A1 | 9/2011 | Sweis | |
| 2012/0109590 A1 | 5/2012 | Trainer et al. | |
| 2012/0212484 A1 | 8/2012 | Haddick et al. | |
| 2013/0123946 A1 | 5/2013 | Govindaraj et al. | |
| 2013/0212214 A1 | 8/2013 | Lawson et al. | |
| 2013/0218867 A1 | 8/2013 | DeLuca et al. | |
| 2013/0332212 A1 | 12/2013 | Cohen | |
| 2014/0013313 A1 | 1/2014 | Eker et al. | |
| 2014/0047413 A1 | 2/2014 | Sheive et al. | |
| 2014/0096108 A1 | 4/2014 | Austin | |
| 2014/0130020 A1 | 5/2014 | Boshernitsan et al. | |
| 2014/0229389 A1 | 8/2014 | Pantaleano et al. | |
| 2014/0337277 A1 | 11/2014 | Asenjo et al. | |
| 2014/0359586 A1 | 12/2014 | Payette et al. | |
| 2015/0180734 A1 | 6/2015 | Maes et al. | |
| 2015/0186119 A1 | 7/2015 | Chouinard et al. | |
| 2015/0248845 A1 * | 9/2015 | Postlethwaite | G09B 19/24 |
| | | | 434/234 |
| 2016/0140930 A1 * | 5/2016 | Pusch | G06F 3/011 |
| | | | 345/633 |
| 2016/0274552 A1 | 9/2016 | Strohmenger et al. | |
| 2016/0282853 A1 * | 9/2016 | Michalscheck | G07C 9/00309 |
| 2016/0284128 A1 * | 9/2016 | Michalscheck | G06T 19/006 |
| 2016/0291566 A1 | 10/2016 | Prosak et al. | |
| 2016/0330082 A1 | 11/2016 | Bliss et al. | |
| 2016/0364675 A1 | 12/2016 | Sharma et al. | |
| 2017/0103440 A1 | 4/2017 | Xing et al. | |
| 2017/0206237 A1 | 7/2017 | Sokol et al. | |
| 2017/0308052 A1 | 10/2017 | Kajiyama | |
| 2017/0329687 A1 | 11/2017 | Chorley et al. | |
| 2017/0336947 A1 | 11/2017 | Bliss et al. | |
| 2017/0357565 A1 | 12/2017 | Ledet | |
| 2018/0025286 A1 | 1/2018 | Gorelik et al. | |
| 2018/0039905 A1 | 2/2018 | Anghel et al. | |
| 2018/0052451 A1 | 2/2018 | Billi-Duran et al. | |
| 2018/0083982 A1 | 3/2018 | Asenjo et al. | |
| 2018/0129276 A1 | 5/2018 | Nguyen et al. | |
| 2018/0130260 A1 * | 5/2018 | Schmirler | G06F 3/011 |
| 2018/0131907 A1 * | 5/2018 | Schmirler | H04N 23/698 |
| 2018/0136910 A1 | 5/2018 | Noetzelmann et al. | |
| 2018/0169517 A1 * | 6/2018 | Balest | A63F 13/211 |
| 2018/0188715 A1 * | 7/2018 | Cella | H04W 4/38 |
| 2018/0192075 A1 | 7/2018 | Chambers et al. | |
| 2018/0197347 A1 | 7/2018 | Tomizuka | |
| 2018/0246803 A1 | 8/2018 | Zhang | |
| 2018/0267496 A1 * | 9/2018 | Wang | G05B 19/056 |
| 2018/0299863 A1 * | 10/2018 | Caine | H04L 63/107 |
| 2018/0307311 A1 * | 10/2018 | Webb | G06T 3/40 |
| 2018/0342106 A1 * | 11/2018 | Rosado | G06Q 10/109 |
| 2018/0357922 A1 | 12/2018 | Dutta et al. | |
| 2018/0373885 A1 | 12/2018 | Arad et al. | |
| 2019/0012151 A1 | 1/2019 | Holbrook et al. | |
| 2019/0057548 A1 * | 2/2019 | Singh | G09B 25/02 |
| 2019/0079643 A1 | 3/2019 | Kershaw et al. | |
| 2019/0079740 A1 | 3/2019 | Sharma et al. | |
| 2019/0129181 A1 * | 5/2019 | Polcak | G02B 27/0093 |
| 2019/0146577 A1 | 5/2019 | Rokade et al. | |
| 2019/0147655 A1 | 5/2019 | Galera et al. | |
| 2019/0171187 A1 * | 6/2019 | Cella | G05B 19/4183 |
| 2019/0188108 A1 | 6/2019 | Jagannathan | |
| 2019/0205113 A1 | 7/2019 | Karpoff et al. | |
| 2019/0220253 A1 | 7/2019 | Pradhan et al. | |
| 2019/0279132 A1 | 9/2019 | Escriche et al. | |
| 2019/0279424 A1 | 9/2019 | Clausen et al. | |
| 2019/0325660 A1 * | 10/2019 | Schmirler | G06F 3/011 |
| 2019/0385342 A1 | 12/2019 | Freeman et al. | |
| 2020/0019147 A1 | 1/2020 | Ludwig et al. | |
| 2020/0019493 A1 | 1/2020 | Ramakrishna et al. | |
| 2020/0150638 A1 | 5/2020 | Mourzine et al. | |
| 2020/0175395 A1 | 6/2020 | Kathiresan et al. | |
| 2020/0285462 A1 | 9/2020 | Sabath et al. | |
| 2020/0371665 A1 | 11/2020 | Clausen et al. | |
| 2021/0011712 A1 | 1/2021 | Grant et al. | |
| 2021/0089276 A1 | 3/2021 | Dunn et al. | |
| 2021/0089278 A1 | 3/2021 | Dunn et al. | |
| 2021/0096526 A1 | 4/2021 | Ericsson et al. | |
| 2021/0096704 A1 | 4/2021 | Ericsson et al. | |
| 2021/0096827 A1 | 4/2021 | Stump et al. | |
| 2021/0294307 A1 | 9/2021 | Onteddu et al. | |
| 2021/0327303 A1 | 10/2021 | Buras et al. | |

(56) References Cited

U.S. PATENT DOCUMENTS

| | | | |
|---|---|---|---|
| 2021/0327304 A1 | 10/2021 | Buras et al. | |
| 2021/0397166 A1 | 12/2021 | SayyarRodsari et al. | |
| 2021/0397171 A1 | 12/2021 | SayyarRodsari et al. | |

FOREIGN PATENT DOCUMENTS

| | | |
|---|---|---|
| CN | 108829024 A | 11/2018 |
| CN | 208314755 U | 1/2019 |
| CN | 109765836 A | 5/2019 |
| CN | 109840085 A | 6/2019 |
| EP | 1 256 861 A1 | 11/2002 |
| EP | 1 296 232 A2 | 3/2003 |
| EP | 2 177 986 A1 | 4/2010 |
| EP | 2 801 939 A1 | 11/2014 |
| EP | 3 101 565 A1 | 7/2016 |
| EP | 3 070 548 A2 | 9/2016 |
| EP | 3 318 944 A2 | 5/2018 |
| EP | 3 376 325 A1 | 9/2018 |
| EP | 3511820 A1 | 7/2019 |
| EP | 3798768 A2 | 3/2021 |
| WO | 2008/115644 A1 | 9/2008 |
| WO | 2014/092694 A1 | 6/2014 |
| WO | 2016/053337 A1 | 4/2016 |
| WO | 2016/195690 A1 | 12/2016 |
| WO | 2019/136754 A1 | 7/2019 |

OTHER PUBLICATIONS

Tuma et al., "The Process Simulation using by Virtual Reality", 2014, Procedia Engineering 69 ( 2014 ) 1015-1020. (Year: 2014).*
Rodriguez et al., "Developing a Mixed Reality Assistance System based on Projection Mapping Technology for Manual Operations at Assembly Workstations", 2015, Procedia Computer Science 75 ( 2015 ) 327-333. (Year: 2015).*
Muljber et al., "Virtual reality applications in manufacturing process simulation", 2004, Journal of Materials Processing Technology 155-156 (2004) 1834-1838. (Year: 2004).*
Dorozhkin et al., "Coupling of interactive manufacturing operations simulation and immersive virtual reality", Jul. 2009, Virtual Reality (2012) 16:15-23. (Year: 2009).*
Non-Final office action received for U.S. Appl. No. 16/584,415 dated Oct. 6, 2022, 72 Pages.
Non-Final office action received for U.S. Appl. No. 17/340,931 dated Oct. 12, 2022, 108 Pages.
Non-Final office action received for U.S. Appl. No. 17/340,861 dated Oct. 7, 2022, 102 Pages.
Non-Final office action received for U.S. Appl. No. 17/692,454 dated Oct. 13, 2022, 46 Pages.
Notice of Allowance received for U.S. Appl. No. 17/340,931 dated Jan. 24, 2023, 248 pages.
Notice of Allowance received for U.S. Appl. No. 17/340,861 dated Feb. 2, 2023, 6 pages.
Notice of Allowance received for U.S. Appl. No. 17/570,552 dated Feb. 3, 2023, 68 pages.
Notice of Allowance received for U.S. Appl. No. 17/570,552 dated Feb. 15, 2023, 9 pages.
Notice of Allowance received for U.S. Appl. No. 17/692,454 dated Feb. 1, 2023, 6 pages.
Communication pursuant to Article 94(3) EPC received for European Patent Application Serial No. 20166772.2 dated Mar. 10, 2023, 6 pages.
Decision to grant a European patent pursuant to Article 97(1) EPC received for European Patent Application Serial No. 20166680.7 dated Nov. 4, 2022, 2 pages.
Notice of Allowance received for U.S. Appl. No. 16/584,415 dated Mar. 15, 2023, 73 pages.
Communication pursuant to Article 94(3) EPC received for E.P Patent Application Serial No. 20166286.3 dated Jul. 6, 2022, 5 pages.
Communication pursuant to Article 94(3) EPC received for E.P Patent Application Serial No. 20167073.4 dated Aug. 11, 2022, 8 pages.
Notice of Allowance received for U.S. Appl. No. 17/340,861 dated Dec. 30, 2022, 105 pages.
Notice of Allowance received for U.S. Appl. No. 17/692,454 dated Jan. 19, 2023, 18 pages.
Communication pursuant to Article 94(3) EPC received for European Patent Application Serial No. 20166284.8 dated Oct. 14, 2022, 6 pages.
Communication pursuant to Article 94(3) EPC received for European Patent Application Serial No. 20166776.3 dated Nov. 23, 2022, 7 pages.
Communication pursuant to Article 94(3) EPC received for European Patent Application Serial No. 21165314.2 dated Dec. 23, 2022, 6 pages.
Extended European Search Report received for EP Patent Application Serial No. 20167073.4 dated May 28, 2020, 11 pages.
Iriondo et al., "Automatic Generation of the Supervisor Code for Industrial Switched-Mode Systems", IEEE Transactions on Industrial Informatics, IEEE Service Center, vol. 9, No. 4, Nov. 1, 2013, pp. 1868-1878.
Wikipedia, "Semi-supervised learning", URL: https://en.wikipedia.org/w/index.php?title=Semi-supervisedlearning&oldid=900515496, Jun. 6, 2019, pp. 1-7.
Non-final office action received for U.S. Appl. No. 16/580,672 dated Oct. 1, 2020, 106 pages.
Grundy et al., "Generating Domain-Specific Visual Language Tools from Abstract Visual Specifications"; IEEE Transactions on Software Engineering, vol. 39, No. 4, Apr. 2013, pp. 487-515.
Salihbegovic et al., "Design of a Domain Specific Language and IDE for Internet of Things Applications", 38th International Convention on Information and Communication Technology, Electronics and Microelectronics (MIPRO), 2015, pp. 996-1001.
Schmitt et al., "An Evaluation of Domain-Specific Language Technologies for Code Generation", 14th International Conference on Computational Science and Its Applications, 2014, pp. 18-26.
Dwarakanath et al., "Accelerating Test Automation Through a Domain Specific Language", IEEE International Conference on Software Testing, Verification and Validation (ICST), 2017, pp. 460-467.
Preuer, S., "A Domain-Specific Language for Industrial Automation", Software Engineering 2007—Beitrage zu den Workshops-Fachtagung des Gl-Fachbereichs Softwaretechnik. Gesellschaft fi.ir Informatik e. V., 2007.
Vyatkin, V., "Software Engineering in Industrial Automation: State-of-the-Art Review", IEEE Transactions on Industrial Informatics vol. 9, No. 3, 2013, pp. 1234-1249.
NetBeans IDE; Netbeans.org website [full url in ref.], Oct. 1, 2012.
Notice of allowance received for U.S. Appl. No. 16/580,672 dated Oct. 30, 2020, 23 Pages.
Non-final office action received for U.S. Appl. No. 16/580,581 dated Oct. 20, 2020, 51 Pages.
Non-final office action received for U.S. Appl. No. 16/584,298 dated Oct. 20, 2020, 63 Pages.
Non-final office action received for U.S. Appl. No. 16/584,368 dated Nov. 18, 2020, 44 Pages.
Non-final office action received for U.S. Appl. No. 16/584,470 dated Feb. 18, 2021, 46 Pages.
Extended European Search Report received for EP Patent Application Serial No. 20166286.3 dated Jan. 29, 2021.
Eclipse., "Using JavaScript Syntax Coloring," Mar. 5, 2019. Retrieved from internet Jan. 20, 21, https://web.archive.org/web/20190305182138/http://www.eclipse.org:80/pdUhelp/html/using_javascript_syntax_coloring.html.
Extended European Search Report received for EP Patent Application Serial No. 20166776.3 dated Feb. 24, 2021.
Extended European Search Report received for EP Patent Application Serial No. 20167085.8 dated Feb. 5, 2021.
Extended European Search Report received for EP Patent Application Serial No. 20166772.2 dated Feb. 3, 2021.
Extended European Search Report received for EP Patent Application Serial No. 20166680.7 dated Jan. 21, 2021.

(56) References Cited

OTHER PUBLICATIONS

Extended European Search Report received for EP Patent Application Serial No. 20166772.2 dated Apr. 23, 2021, 15 pages.
Extended European Search Report received for EP Patent Application Serial No. 20166284.8 dated Feb. 17, 2021, 08 pages.
Communication pursuant to Rule 69 EPC received for European Patent Application Serial No. 20166284.8 dated Apr. 7, 2021, 2 pages.
Communication pursuant to Rule 69 EPC received for European Patent Application Serial No. 20167085.8 dated Apr. 7, 2021, 2 pages.
Communication pursuant to Rule 69 EPC received for European Patent Application Serial No. 20166680.7 dated Apr. 7, 2021, 2 pages.
Communication pursuant to Rule 69 EPC received for European Patent Application Serial No. 20167073.4 dated Apr. 7, 2021, 2 pages.
Communication pursuant to Rule 69 EPC received for European Patent Application Serial No. 20166776.3 dated Apr. 7, 2021, 2 pages.
Communication pursuant to Rule 69 EPC received for European Patent Application Serial No. 20166286.3 dated Apr. 7, 2021, 2 pages.
Non-final office action received for U.S. Appl. No. 16/584,210 dated Aug. 30, 2021, 60 Pages.
Communication pursuant to Rule 69 EPC received for European Patent Application Serial No. 20166772.2 dated May 31, 2021, 2 pages.
Non-final office action received for U.S. Appl. No. 16/838,330 dated Aug. 5, 2021, 56 Pages.
Notice of Allowance received for U.S Appl. No. 17/157,185 dated Nov. 1, 2021, 51 Pages.
Notice of Allowance received for U.S. Appl. No. 16/838,330 dated Dec. 20, 2021, 78 Pages.
Ewenike, S., et al., Cloud Based Collaborative Software Development: A Review, Gap Analysis and Future Directions, 2017 IEEE/ACS 14th International Conference on Computer Systems and Applications, 2017, [retrieved on Nov. 26, 2021], Retrieved from the Internet: <URL:http://ieeexplore.ieee.org/>, pp. 901-909.
Figueiredo, M., et al., Wolf: Supporting Impact Analysis Activities in Distributed Software Development, 2012 5th International Workshop on Co-operative and Human Aspects of Software Engineering (CHASE), Jun. 2012, [retrieved on Nov. 26, 2021], Retrieved from the Internet: <URL:http://ieeexplore.ieee.org/>, pp. 40-46.
Communication pursuant to Article 94(3) EPC received for European Patent Application Serial No. 20167073.4 dated Oct. 27, 2021, 9 pages.
Communication pursuant to Rule 69 EPC received for European Patent Application Serial No. 20166680.7 dated Nov. 30, 2021, 3 pages.
Extended European Search Report received for EP Patent Application Serial No. 21165314.2 dated Aug. 18, 2021, 13 pages.
Extended European Search Report received for EP Patent Application Serial No. 21165314.2 dated Oct. 11, 2021, 2 pages.
Notice of Allowance received for U.S. Appl. No. 16/584,210 dated Mar. 21, 2022, 112 pages.
Zhang et al., "Design and Interaction Interface Using Augmented Reality for Smart Manufacturing", Procedia Manufacturing, vol. 26, 2018, pp. 1278-1286.
Rabah et al., "Towards Improving the Future of Manufacturing Through Digital Twin and Augmented Reality Technologies", Procedia Manufacturing, vol. 17, 2018, pp. 460-467.
Havard et al., "Digital Twin and Virtual Reality: a Co-simulation Environment for Design and Assessment of Industrial Workstations", Production & Manufacturing Research, vol. 7, No. 1, 2019, pp. 472-489.
Grajewski et al., "Application of Virtual Reality Techniques in Design of Ergonomic Manufacturing Workplaces", Procedia Computer Science, vol. 25, 2013, pp. 289-301.
Zaldevar-Colado et al., "Mixed Reality for Virtual Assembly", 26th IEEE International Symposium on Robot and Human Interactive Communication (RO-MAN), 2017, pp. 739-744.
Coburn et al., "A Review of the Capabilities of Current Low-Cost Virtual Reality Technology and its Potential to Enhance the Design Process", Journal of Computing and Information Science in Engineering, vol. 17, Sep. 2017, pp. 031013-1-031013-1-15.
Notice of Allowance received for U.S. Appl. No. 16/584,415 dated Mar. 31, 2023, 6 pages.
Notice of Allowance received for U.S. Appl. No. 17/340,931 dated Mar. 29, 2023, 8 pages.
Notice of Allowance received for U.S. Appl. No. 17/570,552 dated Mar. 27, 2023, 6 pages.
Notice of Allowance received for U.S. Appl. No. 17/692,454 dated Mar. 31, 2023, 8 pages.
Communication pursuant to Article 94(3) EPC received for EP Patent Application Serial No. 20166286.3 dated Jul. 27, 2023, 8 pages.
Office Action received for Chinese Patent Application Serial No. 202010236312.8 dated Aug. 31, 2023, 8 pages (English Translation Only).
Notice of Allowance received for U.S. Appl. No. 16/584,415 dated Jul. 21, 2023, 12 pages.
Notice of Allowance received for U.S. Appl. No. 18/185,525 dated Jul. 7, 2023, 171 pages.
Notice of Allowance received for U.S. Appl. No. 18/185,525 dated Jul. 12, 2023, 20 pages.
Non-Final office action received for U.S. Appl. No. 17/471,544 dated Aug. 30, 2023, 89 pages.

* cited by examiner

INDUSTRIAL ASSET

VIRTUAL DESIGN ENVIRONMENT

CROSS-REFERENCE TO RELATED APPLICATIONS

This application is a continuation of, and claims priority to, U.S. patent application Ser. No. 16/584,210, filed on Sep. 26, 2019, and entitled, "VIRTUAL DESIGN ENVIRONMENT," the entirety of which is incorporated herein by reference.

BACKGROUND

The subject matter disclosed herein relates generally to industrial automation systems, and, for example, to industrial programming development platforms

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for developing industrial applications is provided, comprising a virtual rendering component configured to render an interactive three-dimensional virtual reality (VR) representation of an industrial facility on a wearable appliance; a user interface component configured to receive VR interaction data representing manual interactions of a wearer of the wearable appliance with the VR representation of the industrial facility, wherein the manual interactions are indicative of design input that defines aspects of an industrial automation system; and a project generation component configured to translate the VR interaction data into executable system project data that satisfies the design input represented by the manual interactions, wherein the system project data comprises at least an executable industrial control program configured to perform control of the industrial automation system and an industrial visualization application configured to visualize at least a portion of the industrial automation system.

Also, one or more embodiments provide a method for developing industrial applications, comprising rendering, by an industrial integrated development environment (IDE) system comprising a processor, an interactive three-dimensional virtual reality (VR) presentation of an industrial area on a wearable client device; receiving, by industrial IDE system, VR interaction data representing manual interactions of a wearer of the wearable client device with the VR presentation of the industrial area, wherein the manual interactions are indicative of design specifications for an industrial automation system; and translating, by the industrial IDE system, the VR interaction data into executable system project data that satisfies the design specifications represented by the manual interactions, wherein the translating comprises translating the VR interaction data to at least an executable industrial control program configured to perform control of the industrial automation system and a visualization application configured to visualize at least a portion of the industrial automation system.

Also, according to one or more embodiments, a non-transitory computer-readable medium is provided having stored thereon instructions that, in response to execution, cause a system to perform operations, the operations comprising rendering, on a wearable appliance, an interactive three-dimensional virtual reality (VR) presentation of an industrial facility; receiving VR interaction data representing manual interactions of a wearer of the wearable appliance with the VR presentation of the industrial facility, wherein the manual interactions are indicative of design specifications for an industrial automation system; and translating the VR interaction data into system project data that satisfies the design specifications represented by the manual interactions, wherein the translating comprises translating the VR interaction data to at least an executable industrial control program configured to perform control of the industrial automation system and a visualization application configured to visualize at least a portion of the industrial automation system.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
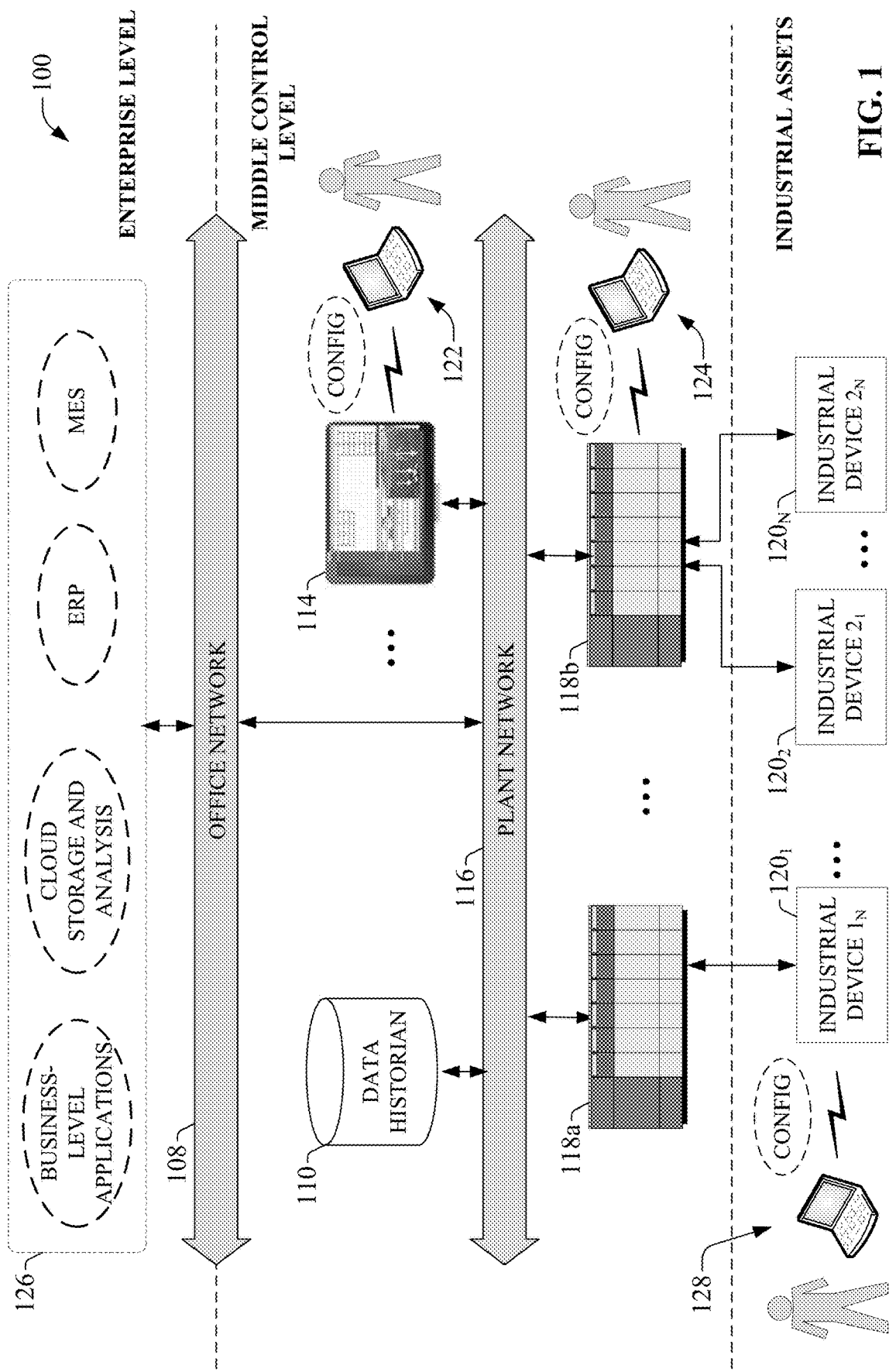
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise substantially any type of code capable of processing input signals read from the industrial devices 120 and controlling output signals generated by the industrial controllers 118, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, pumps, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by their associated control programs and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, a data historian 110 that aggregates and stores production information collected from the industrial controllers 118 or other data sources, device documentation stores containing electronic documentation for the various industrial devices making up the controlled industrial systems, inventory tracking systems, work order management systems, repositories for machine or process drawings and documentation, vendor product documentation storage, vendor knowledgebases, internal knowledgebases, work scheduling applications, or other such systems, some or all of which may reside on an office network 108 of the industrial environment.

Higher-level systems 126 may carry out functions that are less directly related to control of the industrial automation systems on the plant floor, and instead are directed to long term planning, high-level supervisory control, analytics, reporting, or other such high-level functions. These systems 126 may reside on the office network 108 at an external location relative to the plant facility, or on a cloud platform with access to the office and/or plant networks. Higher-level systems 126 may include, but are not limited to, cloud storage and analysis systems, big data analysis systems, manufacturing execution systems, data lakes, reporting systems, etc. In some scenarios, applications running at these higher levels of the enterprise may be configured to analyze control system operational data, and the results of this analysis may be fed back to an operator at the control system or directly to a controller 118 or device 120 in the control system.

The various control, monitoring, and analytical devices that make up an industrial environment must be programmed or configured using respective configuration applications specific to each device. For example, industrial controllers 118 are typically configured and programmed using a control programming development application such as a ladder logic editor (e.g., executing on a client device 124). Using such development platforms, a designer can write control programming (e.g., ladder logic, structured text, function block diagrams, etc.) for carrying out a desired industrial sequence or process and download the resulting program files to the controller 118. Separately, developers design visualization screens and associated navigation structures for HMIs 114 using an HMI development platform (e.g., executing on client device 122) and download the resulting visualization files to the HMI 114. Some industrial devices 120—such as motor drives, telemetry devices, safety input devices, etc.—may also require configuration using separate device configuration tools (e.g., executing on client device 128) that are specific to the device being configured. Such device configuration tools may be used to set device parameters or operating modes (e.g., high/low limits, output signal formats, scale factors, energy consumption modes, etc.).

The necessity of using separate configuration tools to program and configure disparate aspects of an industrial automation system results in a piecemeal design approach whereby different but related or overlapping aspects of an automation system are designed, configured, and programmed separately on different development environments. For example, a motion control system may require an industrial controller to be programmed and a control loop to be tuned using a control logic programming platform, a motor drive to be configured using another configuration platform, and an associated HMI to be programmed using a visualization development platform. Related peripheral systems—such as vision systems, safety systems, etc. —may also require configuration using separate programming or development applications.

This segregated development approach can also necessitate considerable testing and debugging efforts to ensure proper integration of the separately configured system aspects. In this regard, intended data interfacing or coordinated actions between the different system aspects may require significant debugging due to a failure to properly coordinate disparate programming efforts.

Moreover, typical industrial development platforms often require the user to develop industrial control programming and configurations using a non-intuitive workflow driven by the development workspace and editing tools offered by the development platform, and the necessity to interact with these tools using conventional cursor- and keyboard-driven interfaces.

To address at least some of these or other issues, one or more embodiments described herein provide an industrial IDE system that supports a virtual design environment that allows an automation system designer to perform project development via interaction with a virtual reality presentation of the plant facility. The industrial design environment can generate system project data for an automation project—including but not limited to device selections, industrial control programming, device configurations, visualizations, engineering drawings, etc. —based on the developer's manual interactions with the virtual reality presentation. These interactions can include, for example, placing and moving machines or other industrial assets within the virtualized environment, defining trajectories of motion devices or robots using manual gestures, or other such interactive input. The IDE system interprets the developer's interactions as design specifications for the automation system being designed and translates these interactions into control code, visualizations, device configurations, and other executable system components that satisfy the design specifications.

In some embodiments, the virtual design environment can be an integrated platform of an industrial integrated development environment (IDE) for designing, programming, and configuring multiple aspects of an industrial automation system using a common design environment and data model. Embodiments of the industrial IDE can be used to configure and manage automation system devices in a common way, facilitating integrated, multi-discipline programming of control, visualization, and other aspects of the control system.

In general, the industrial IDE supports features that span the full automation lifecycle, including design (e.g., device selection and sizing, controller programming, visualization development, device configuration, testing, etc.); installation, configuration and commissioning; operation, improvement, and administration; and troubleshooting, expanding, and upgrading.

Embodiments of the industrial IDE can include a library of modular code and visualizations that are specific to industry verticals and common industrial applications within those verticals. These code and visualization modules can simplify development and shorten the development cycle, while also supporting consistency and reuse across an industrial enterprise. In some scenarios, code modules and visualization objects can be selected for inclusion into an automation system project based on user interactions with the virtual design environment.

Figure 2:
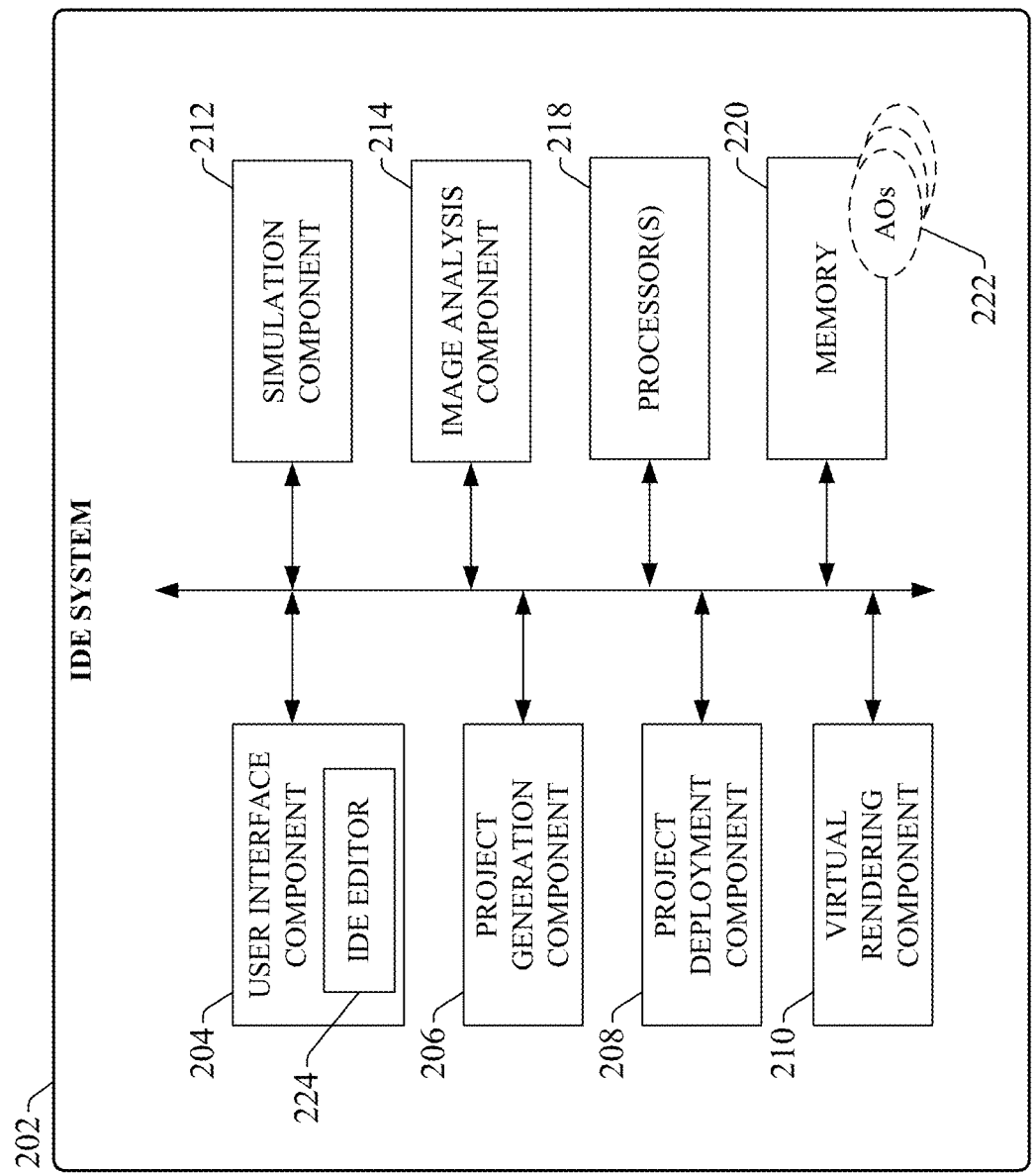
FIG. 2 is a block diagram of an example integrated development environment (IDE) system.

FIG. 2 is a block diagram of an example industrial integrated development environment (IDE) system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

IDE system 202 can include a user interface component 204 including an IDE editor 224, a project generation component 206, a project deployment component 208, a virtual rendering component 210, a simulation component 212, an image analysis component 214, one or more processors 218, and memory 220. In various embodiments, one or more of the user interface component 204, project generation component 206, project deployment component 208, virtual rendering component 210, simulation component 212, image analysis component 214, the one or more processors 218, and memory 220 can be electrically and/or communicatively coupled to one another to perform one or more of the functions of the IDE system 202. In some embodiments, components 204, 206, 208, 210, 212, and 214 can comprise software instructions stored on memory 220 and executed by processor(s) 218. IDE system 202 may also interact with other hardware and/or software components not depicted in FIG. 2. For example, processor(s) 218 may interact with one or more external user interface devices, such as a keyboard, a mouse, a display monitor, a touchscreen, or other such interface devices.

User interface component 204 can be configured to receive user input and to render output to the user in any suitable format (e.g., visual, audio, tactile, etc.). In some embodiments, user interface component 204 can be configured to communicatively interface with an IDE client that executes on a client device (e.g., a wearable AR/VR device, a laptop computer, tablet computer, smart phone, etc.) that is communicatively connected to the IDE system 202 (e.g., via a hardwired or wireless connection). The user interface component 204 can then receive user input data and render output data via the IDE client. In other embodiments, user interface component 314 can be configured to generate and serve suitable interface screens or environments to a client device, and exchange data via these interface environments. Input data that can be received via various embodiments of user interface component 204 can include, but is not limited to, programming code, industrial design specifications or goals, engineering drawings, interactive augmented reality or virtual reality (AR/VR) input, domain-specific language (DSL) definitions, video or image data, or other such input. Output data rendered by various embodiments of user interface component 204 can include interactive VR presentations, program code, programming feedback (e.g., error and highlighting, coding suggestions, etc.), programming and visualization development screens, etc.

Project generation component 206 can be configured to create a system project comprising one or more project files based on design input received via the user interface component 204, as well as industrial knowledge, predefined code modules and visualizations, and automation objects 222 maintained by the IDE system 202. Project deployment component 208 can be configured to commission the system project created by the project generation component 206 to appropriate industrial devices (e.g., controllers, HMI terminals, motor drives, AR/VR systems, etc.) for execution. To this end, project deployment component 208 can identify the appropriate target devices to which respective portions of the system project should be sent for execution, translate these respective portions to formats understandable by the target devices, and deploy the translated project components to their corresponding devices.

Virtual rendering component 210 can be configured to render—via user interface component 204—a virtual reality (VR) presentation of an industrial facility or installation area on a user's wearable appliance, and translate user interactions with the VR presentation. The VR presentation can be generated based on a digital plant model stored on the IDE system 202. The user's interactions with the VR presentation can be interpreted as design specifications for a new automation system, or specifications for modifying the design or operation of an existing automation system, and translated to project data satisfying the design specifications by the project generation component 206. This project data can include, for example, controller code; visualization objects, dashboards, or mashups; device configurations; bills of materials; equipment recommendations; engineering drawings; or other such project components.

Simulation component 212 can be configured to simulate execution of multiple control devices—including but not limited to industrial controllers, motor drives, and other such control devices—using the system project data and the digital plant model. Image analysis component 214 can be configured to extract industrial system design data from images or video data submitted to the IDE system 202 and provide this extracted design data to the project generation component 206 for translation into system project data.

The one or more processors 218 can perform one or more of the functions described herein with reference to the systems and/or methods disclosed. Memory 220 can be a computer-readable storage medium storing computer-executable instructions and/or information for performing the functions described herein with reference to the systems and/or methods disclosed.

Figure 3:
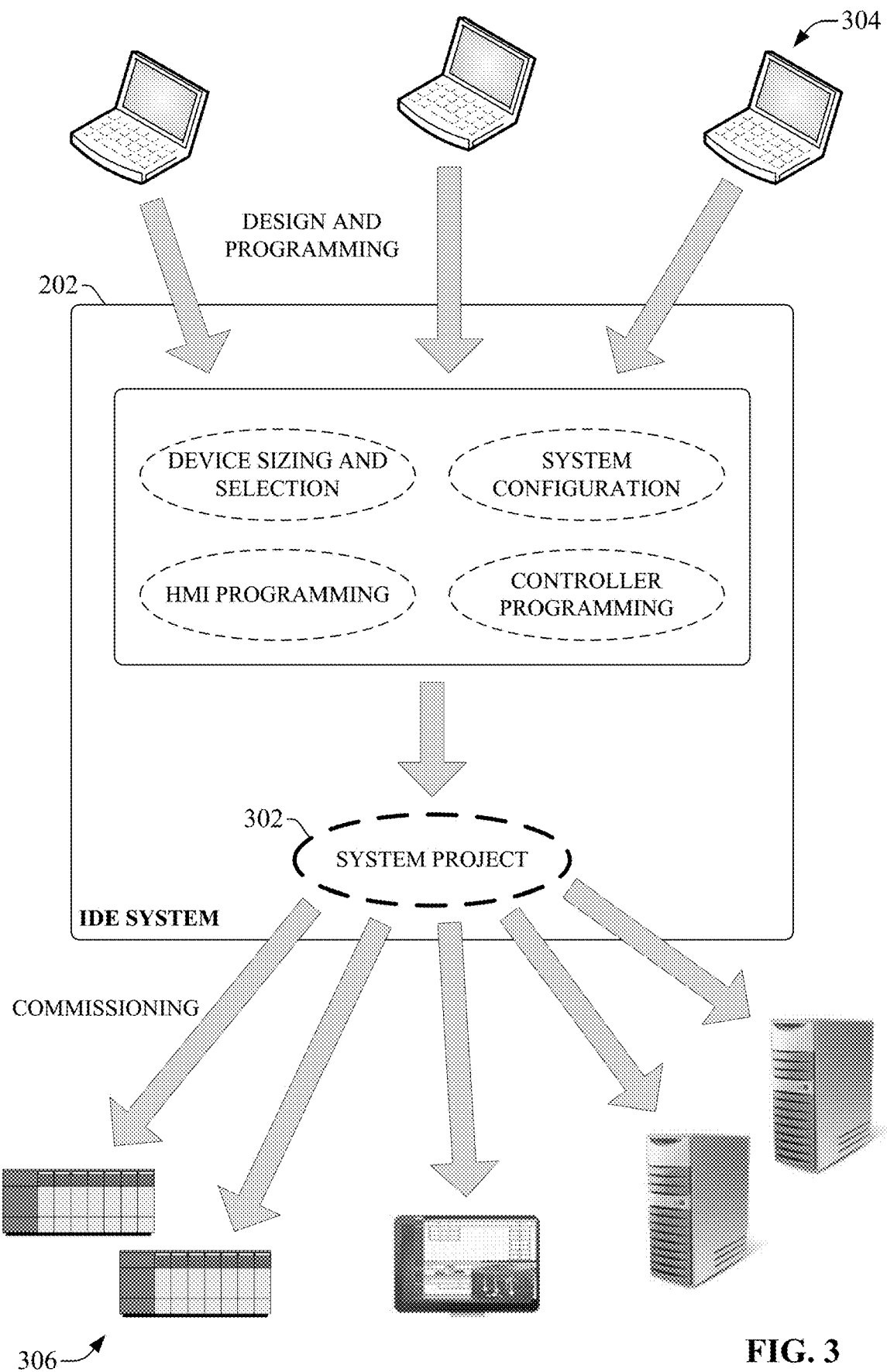
FIG. 3 is a diagram illustrating a generalized architecture of an industrial IDE system.

FIG. 3 is a diagram illustrating a generalized architecture of an industrial IDE system 202 that can support a virtual design environment according to one or more embodiments. Industrial IDE system 202 can implement a common set of services and workflows spanning not only design, but also commissioning, operation, and maintenance. In terms of design, the IDE system 202 can support not only industrial controller programming and HMI development, but also sizing and selection of system components, device/system configuration, AR/VR visualizations, and other features. The IDE system 202 can also include tools that simplify and automate commissioning of the resulting project and assist with subsequent administration of the deployed system during runtime.

Embodiments of the IDE system 202 that are implemented on a cloud platform also facilitate collaborative project development whereby multiple developers 304 contribute design and programming input to a common automation system project 302. Collaborative tools supported by the IDE system can manage design contributions from the multiple contributors and perform version control of the aggregate system project 302 to ensure project consistency.

Based on design and programming input from one or more developers 304, IDE system 202 generates a system project 302 comprising one or more project files. The system project 302 encodes one or more of control programming; HMI, AR, and/or VR visualizations; device or sub-system configuration data (e.g., drive parameters, vision system configurations, telemetry device parameters, safety zone definitions, etc.); or other such aspects of an industrial automation system being designed. IDE system 202 can identify the appropriate target devices 306 on which respective aspects of the system project 302 should be executed (e.g., industrial controllers, HMI terminals, variable frequency drives, safety devices, etc.), translate the system project 302 to executable files that can be executed on the respective target devices, and deploy the executable files to their corresponding target devices 306 for execution, thereby commissioning the system project 302 to the plant floor for implementation of the automation project.

Figure 4:
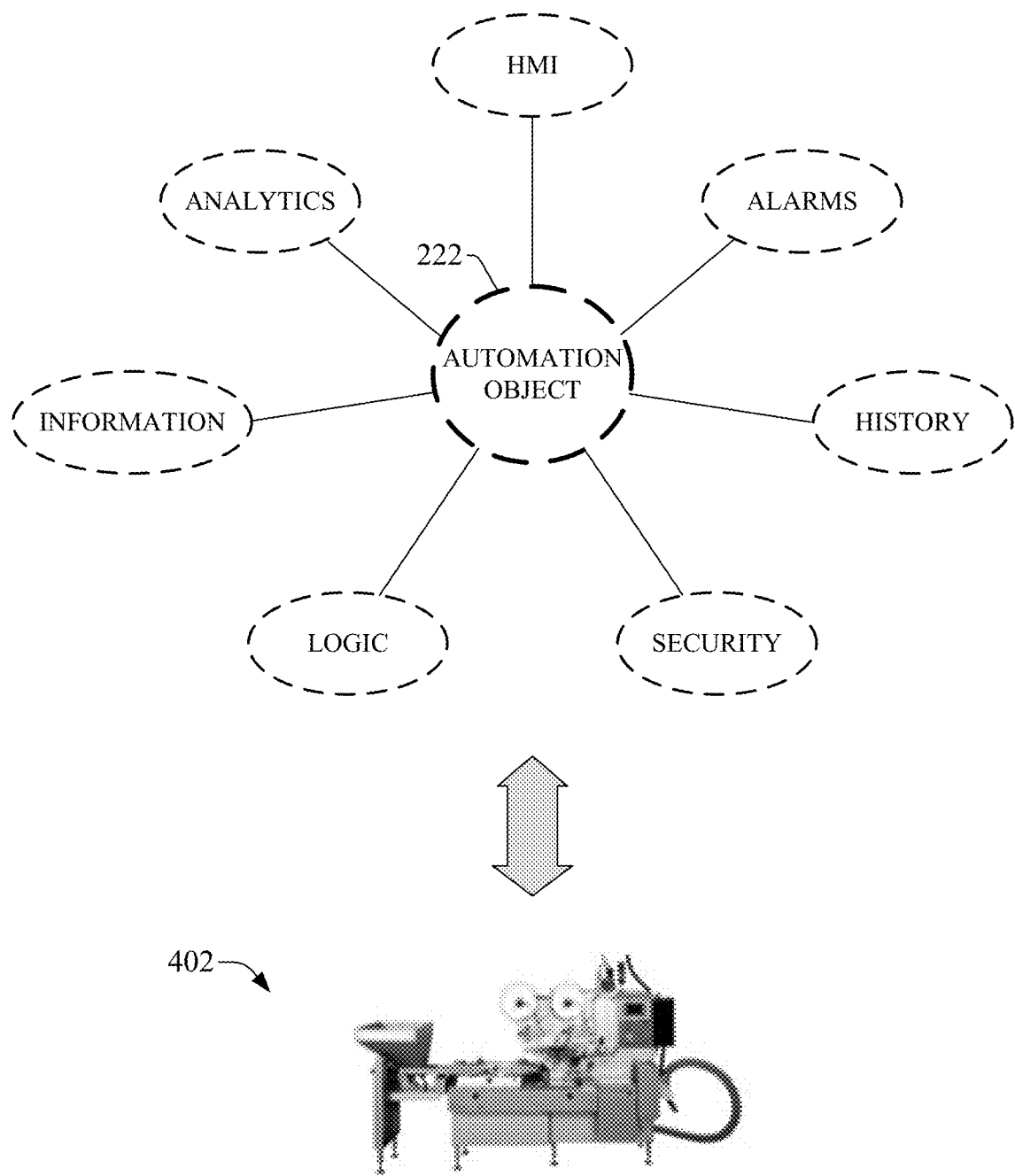
FIG. 4 is a diagram illustrating several example automation object properties that can be leveraged by the IDE system in connection with building, deploying, and executing a system project.

To support enhanced development capabilities, some embodiments of IDE system 202 can be built on an object-based data model rather than a tag-based architecture. Automation objects 222 serve as the building block for this object-based development architecture. FIG. 4 is a diagram illustrating several example automation object properties that can be leveraged by the IDE system 202 in connection with building, deploying, and executing a system project 302. Automation objects 222 can be created and augmented during design, integrated into larger data models, and consumed during runtime. These automation objects 222 provide a common data structure across the IDE system 202 and can be stored in an object library (e.g., part of memory 220) for reuse. The object library can store predefined automation objects 222 representing various classifications of real-world industrial assets 402, including but not limited to pumps, tanks, values, motors, motor drives (e.g., variable frequency drives), industrial robots, actuators (e.g., pneumatic or hydraulic actuators), or other such assets. Automation objects 222 can represent elements at substantially any level of an industrial enterprise, including individual devices, machines made up of many industrial devices and components (some of which may be associated with their own automation objects 222), and entire production lines or process control systems.

An automation object 222 for a given type of industrial asset can encode such aspects as 2D or 3D visualizations, alarms, control coding (e.g., logic or other type of control programming), analytics, startup procedures, testing protocols, validation reports, simulations, schematics, security protocols, and other such properties associated with the industrial asset 402 represented by the object 222. Automation objects 222 can also be geotagged with location information identifying the location of the associated asset. During runtime of the system project 302, the automation object 222 corresponding to a given real-world asset 402 can also record status or operational history data for the asset. In general, automation objects 222 serve as programmatic representations of their corresponding industrial assets 402, and can be incorporated into a system project 302 as elements of control code, a 2D or 3D visualization, a knowledgebase or maintenance guidance system for the industrial assets, or other such aspects.

Figure 5:
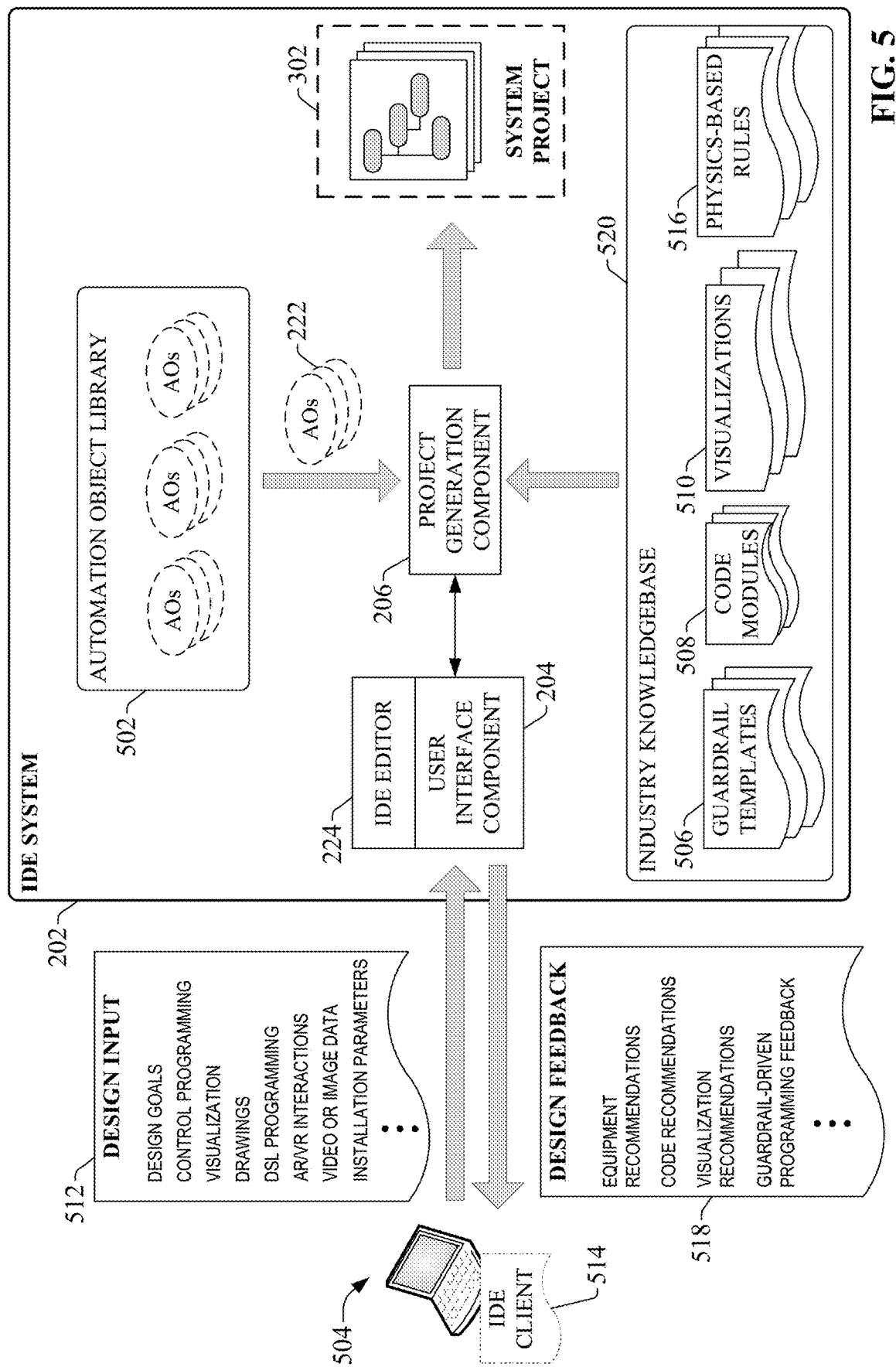
FIG. 5 is a diagram illustrating example data flows associated with creation of a system project for an automation system being designed using an industrial IDE system.

FIG. 5 is a diagram illustrating example data flows associated with creation of a system project 302 for an automation system being designed using IDE system 202 according to one or more embodiments. A client device 504 (e.g., a wearable AR/VR appliance, a laptop computer, tablet computer, desktop computer, mobile device, etc.) executing an IDE client application 514 can access the IDE system's project development tools and leverage these tools to create a comprehensive system project 302 for an automation system being developed. Through interaction with the system's user interface component 204, developers can submit design input 512 to the IDE system 202 in various supported formats, including industry-specific control programming (e.g., control logic, structured text, sequential function charts, etc.) and HMI screen configuration input. As will be described in more detail herein, design input 512 can also be submitted via user interaction with a virtual design environment generated by virtual rendering component 210. Based on this design input 512 and information stored in an industry knowledgebase 520 (predefined code modules 508 and visualizations 510, guardrail templates 506, physics-based rules 516, etc.), user interface component 204 renders design feedback 518 designed to assist the developer in connection with developing a system project 302 for configuration, control, and visualization of an industrial automation system.

In addition to control programming and visualization definitions, some embodiments of IDE system 202 can be configured to receive digital engineering drawings (e.g., computer-aided design (CAD) files) as design input 512. In such embodiments, project generation component 206 can generate portions of the system project 302—e.g., by automatically generating control and/or visualization code—based on analysis of existing design drawings. Drawings that can be submitted as design input 512 can include, but are not limited to, P & ID drawings, mechanical drawings, flow diagrams, or other such documents. For example, a P & ID drawing can be imported into the IDE system 202, and project generation component 206 can identify elements (e.g., tanks, pumps, etc.) and relationships therebetween conveyed by the drawings. Project generation component 206 can associate or map elements identified in the drawings with appropriate automation objects 222 corresponding to these elements (e.g., tanks, pumps, etc.) and add these automation objects 222 to the system project 302. The device-specific and asset-specific automation objects 222 include suitable code and visualizations to be associated with the elements identified in the drawings. In general, the IDE system 202 can examine one or more different types of drawings (mechanical, electrical, piping, etc.) to determine relationships between devices, machines, and/or assets (including identifying common elements across different drawings) and intelligently associate these elements with appropriate automation objects 222, code modules 508, and/or visualizations 510. The IDE system 202 can leverage physics-based rules 516 as well as pre-defined code modules 508 and visualizations 510 as necessary in connection with generating code or project data for system project 302.

The IDE system 202 can also determine whether pre-defined visualization content is available for any of the objects discovered in the drawings and generate appropriate HMI screens or AR/VR content for the discovered objects based on these pre-defined visualizations. To this end, the IDE system 202 can store industry-specific, asset-specific, and/or application-specific visualizations 510 that can be accessed by the project generation component 206 as needed. These visualizations 510 can be classified according to industry or industrial vertical (e.g., automotive, food and drug, oil and gas, pharmaceutical, etc.), type of industrial asset (e.g., a type of machine or industrial device), a type of industrial application (e.g., batch processing, flow control, web tension control, sheet metal stamping, water treatment, etc.), or other such categories. Predefined visualizations 510 can comprise visualizations in a variety of formats, including but not limited to HMI screens or windows, dashboards, mashups that aggregate data from multiple pre-specified sources, AR overlays, VR objects representing 3D virtualizations of the associated industrial asset, or other such visualization formats. IDE system 202 can select a suitable visualization for a given object based on a predefined association between the object type and the visualization content.

In another example, markings applied to an engineering drawing by a user can be understood by some embodiments of the project generation component 206 to convey a specific design intention or parameter. For example, a marking in red pen can be understood to indicate a safety zone, two circles connected by a dashed line can be interpreted as a gearing relationship, and a bold line may indicate a camming relationship. In this way, a designer can sketch out design goals on an existing drawing in a manner that can be understood and leveraged by the IDE system 202 to generate code and visualizations. In another example, the project generation component 206 can learn permissives and interlocks (e.g., valves and their associated states) that serve as necessary preconditions for starting a machine based on analysis of the user's CAD drawings. Project generation component 206 can generate any suitable code (ladder logic, function blocks, etc.), device configurations, and visualizations based on analysis of these drawings and markings for incorporation into system project 302. In some embodiments, user interface component 204 can include design tools for developing engineering drawings within the IDE platform itself, and the project generation component 206 can generate this code as a background process as the user is creating the drawings for a new project. In some embodiments, project generation component 206 can also translate state machine drawings to a corresponding programming sequence, yielding at least skeletal code that can be enhanced by the developer with additional programming details as needed.

Also, or in addition, some embodiments of IDE system 202 can support goal-based automated programming. For example, the user interface component 204 can allow the user to specify production goals for an automation system being designed (e.g., specifying that a bottling plant being designed must be capable of producing at least 5000 bottles per second during normal operation) and any other relevant design constraints applied to the design project (e.g., budget limitations, available floor space, available control cabinet space, etc.). Based on this information, the project generation component 206 will generate portions of the system project 302 to satisfy the specified design goals and constraints. Portions of the system project 302 that can be generated in this manner can include, but are not limited to, device and equipment selections (e.g., definitions of how many pumps, controllers, stations, conveyors, drives, or other assets will be needed to satisfy the specified goal), associated device configurations (e.g., tuning parameters, network settings, drive parameters, etc.), control coding, or HMI screens suitable for visualizing the automation system being designed.

Some embodiments of the project generation component 206 can also generate at least some of the project code for system project 302 based on knowledge of parts that have been ordered for the project being developed. This can involve accessing the customer's account information maintained by an equipment vendor to identify devices that have been purchased for the project. Based on this information the project generation component 206 can add appropriate automation objects 222 and associated code modules 508 corresponding to the purchased assets, thereby providing a starting point for project development.

Some embodiments of project generation component 206 can also monitor customer-specific design approaches for commonly programmed functions (e.g., pumping applications, batch processes, palletizing operations, etc.) and generate recommendations for design modules (e.g., code modules 508, visualizations 510, etc.) that the user may wish to incorporate into a current design project based on an inference of the designer's goals and learned approaches to achieving the goal. To this end, some embodiments of project generation component 206 can be configured to monitor design input 512 over time and, based on this monitoring, learn correlations between certain design actions (e.g., addition of certain code modules or snippets to design projects, selection of certain visualizations, etc.) and types of industrial assets, industrial sequences, or industrial processes being designed. Project generation component 206 can record these learned correlations and generate recommendations during subsequent project development sessions based on these correlations. For example, if project generation component 206 determines, based on analysis of design input 512, that a designer is currently developing a control project involving a type of industrial equipment that has been programmed and/or visualized in the past in a repeated, predictable manner, the project generation component 206 can instruct user interface component 204 to render recommended development steps or code modules 508 the designer may wish to incorporate into the system project 302 based on how this equipment was configured and/or programmed in the past.

In some embodiments, IDE system 202 can also store and implement guardrail templates 506 that define design guardrails intended to ensure the project's compliance with internal or external design standards. Based on design parameters defined by one or more selected guardrail templates 506, user interface component 204 can provide, as a subset of design feedback 518, dynamic recommendations or other types of feedback designed to guide the developer in a manner that ensures compliance of the system project 302 with internal or external requirements or standards (e.g., certifications such as TUV certification, in-house design standards, industry-specific or vertical-specific design standards, etc.). This feedback 518 can take the form of text-based recommendations (e.g., recommendations to rewrite an indicated portion of control code to comply with a defined programming standard), syntax highlighting, error highlighting, auto-completion of code snippets, or other such formats. In this way, IDE system 202 can customize design feedback 518—including programming recommendations, recommendations of predefined code modules 508 or visualizations 510, error and syntax highlighting, etc. —in accordance with the type of industrial system being developed and any applicable in-house design standards.

Guardrail templates 506 can also be designed to maintain compliance with global best practices applicable to control programming or other aspects of project development. For example, user interface component 204 may generate and render an alert if a developer's control programing is deemed to be too complex as defined by criteria specified by one or more guardrail templates 506. Since different verticals (e.g., automotive, pharmaceutical, oil and gas, food and drug, marine, etc.) must adhere to different standards and certifications, the IDE system 202 can maintain a library of guardrail templates 506 for different internal and external standards and certifications, including customized user-specific guardrail templates 506. These guardrail templates 506 can be classified according to industrial vertical, type of industrial application, plant facility (in the case of custom in-house guardrail templates 506) or other such categories. During development, project generation component 206 can select and apply a subset of guardrail templates 506 determined to be relevant to the project currently being developed, based on a determination of such aspects as the industrial vertical to which the project relates, the type of industrial application being programmed (e.g., flow control, web tension control, a certain batch process, etc.), or other such aspects. Project generation component 206 can leverage guardrail templates 506 to implement rules-based programming, whereby programming feedback (a subset of design feedback 518) such as dynamic intelligent autocorrection, type-aheads, or coding suggestions are rendered based on encoded industry expertise and best practices (e.g., identifying inefficiencies in code being developed and recommending appropriate corrections).

Users can also run their own internal guardrail templates 506 against code provided by outside vendors (e.g., OEMs) to ensure that this code complies with in-house programming standards. In such scenarios, vendor-provided code can be submitted to the IDE system 202, and project generation component 206 can analyze this code in view of in-house coding standards specified by one or more custom guardrail templates 506. Based on results of this analysis, user interface component 204 can indicate portions of the vendor-provided code (e.g., using highlights, overlaid text, etc.) that do not conform to the programming standards set forth by the guardrail templates 506, and display suggestions for modifying the code in order to bring the code into compliance. As an alternative or in addition to recommending these modifications, some embodiments of project generation component 206 can be configured to automatically modify the code in accordance with the recommendations to bring the code into conformance.

In making coding suggestions as part of design feedback 518, project generation component 206 can invoke selected code modules 508 stored in a code module database (e.g., on memory 220). These code modules 508 comprise standardized coding segments for controlling common industrial tasks or applications (e.g., palletizing, flow control, web tension control, pick-and-place applications, conveyor control, etc.). In some embodiments, code modules 508 can be categorized according to one or more of an industrial vertical (e.g., automotive, food and drug, oil and gas, textiles, marine, pharmaceutical, etc.), an industrial application, or a type of machine or device to which the code module 508 is applicable. In some embodiments, project generation component 206 can infer a programmer's current programming task or design goal based on programmatic input being provided by a the programmer (as a subset of design input 512), and determine, based on this task or goal, whether one of the pre-defined code modules 508 may be appropriately added to the control program being developed to achieve the inferred task or goal. For example, project generation component 206 may infer, based on analysis of design input 512, that the programmer is currently developing control code for transferring material from a first tank to another tank, and in response, recommend inclusion of a predefined code module 508 comprising standardized or frequently utilized code for controlling the valves, pumps, or other assets necessary to achieve the material transfer.

Customized guardrail templates 506 can also be defined to capture nuances of a customer site that should be taken into consideration in the project design. For example, a guardrail template 506 could record the fact that the automation system being designed will be installed in a region where power outages are common, and will factor this consideration when generating design feedback 518; e.g., by recommending implementation of backup uninterruptable power supplies and suggesting how these should be incorporated, as well as recommending associated programming or control strategies that take these outages into account.

IDE system 202 can also use guardrail templates 506 to guide user selection of equipment or devices for a given design goal; e.g., based on the industrial vertical, type of control application (e.g., sheet metal stamping, die casting, palletization, conveyor control, web tension control, batch processing, etc.), budgetary constraints for the project, physical constraints at the installation site (e.g., available floor, wall or cabinet space; dimensions of the installation space; etc.), equipment already existing at the site, etc. Some or all of these parameters and constraints can be provided as design input 512, and user interface component 204 can render the equipment recommendations as a subset of design feedback 518. In some embodiments, project generation component 206 can also determine whether some or all existing equipment can be repurposed for the new control system being designed. For example, if a new bottling line is to be added to a production area, there may be an opportunity to leverage existing equipment since some bottling lines already exist. The decision as to which devices and equipment can be reused will affect the design of the new control system. Accordingly, some of the design input 512 provided to the IDE system 202 can include specifics of the customer's existing systems within or near the installation site. In some embodiments, project generation component 206 can apply artificial intelligence (AI) or traditional analytic approaches to this information to determine whether existing equipment specified in design in put 512 can be repurposed or leveraged. Based on results of this analysis, project generation component 206 can generate, as design feedback 518, a list of any new equipment that may need to be purchased based on these decisions.

Figure 6:
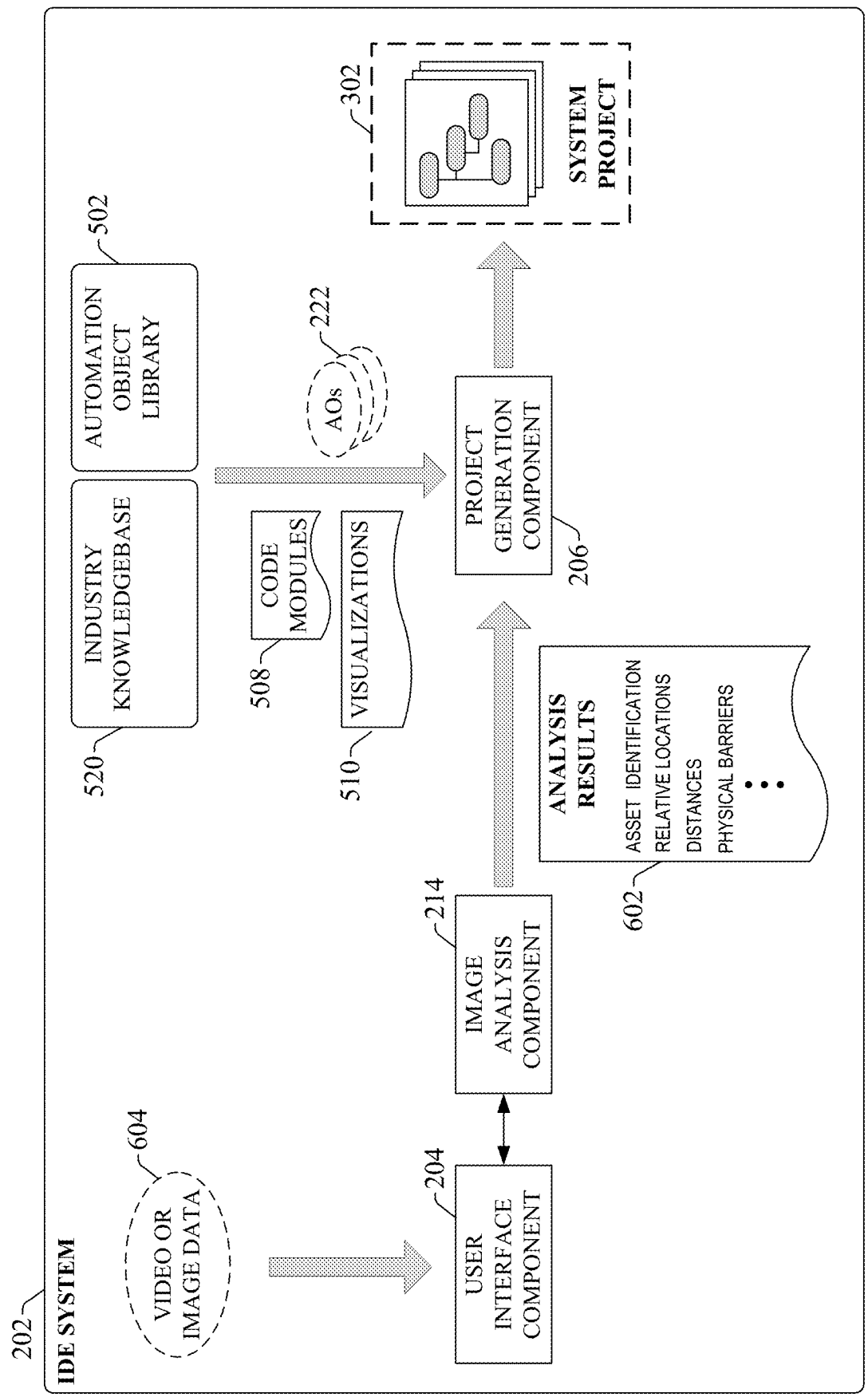
FIG. 6 is a diagram illustrating example data flows associated with extraction of design data from video or image data by an industrial IDE system.

In some embodiments, IDE system 202 can offer design recommendations based on an understanding of the physical environment within which the automation system being designed will be installed. To this end, information regarding the physical environment can be submitted to the IDE system 202 (as part of design input 512) in the form of 2D or 3D images or video of the plant environment. FIG. 6 is a diagram illustrating example data flows associated with extraction of design data from video or image data by IDE system 202 according to one or more embodiments. In this example, video or image data 604 representing an area of plant facility in which a new automation system is to be installed, or an existing automation system is to be modified, is submitted to the IDE system 202 via user interface component 204. In some scenarios, the video or image data 604 may be recorded from one or more video cameras mounted within or carried through the plant. Video or image data 604 may also comprise three-dimensional volumetric video recorded at the installation area in some scenarios. In another example, video or image data 604 may be recorded by a wearable AR/VR appliance worn by a user as the user traverses the area of the plant at which the new automation system is to be installed. In some embodiments, as an alternative to video or image data 604, environmental information can also be obtained from an existing digital twin or other type of digital model of the plant.

Image analysis component 214 can analyze this image, video, or digital twin data to identify physical elements or barriers within the recorded installation area (e.g., walls, girders, safety fences, existing machines and devices, etc.) and physical relationships between these elements. This can include ascertaining distances between machines, lengths of piping runs, locations and distances of wiring harnesses or cable trays, etc. Image analysis component 214 then provides these analysis results 602 to project generation component 206, which generates a least a portion of the system project 302 based on the environmental information reported by the results 602. This can include, for example, adding context to schematics generated as part of system project 302, generating recommendations regarding optimal locations for devices or machines (e.g., recommending a minimum separation between power and data cables), or making other refinements to the system project 302.

Project generation component 206 can translate some of the environmental information obtained from the analysis results 602 to automation objects 222 that can be added to the system project 302. For example, if image analysis component 214 recognizes a motor drive or another type of industrial asset recorded in the video or image data 604, project generation component 206 can determine whether an automation object 222 is available for the recognized asset and, if so, add this an automation object 222 to system project 320. Similarly, if industrial assets having corresponding code modules 508 or visualizations 510 are discovered in the video or image data 604, project generation component 206 can retrieve and add these project elements to the system project 302.

At least some of the design data generated from the video or image data 604 can be generated based on physics-based rules 516, which can be referenced by project generation component 206 to determine such physical design specifications as minimum safe distances from hazardous equipment (which may also factor into determining suitable locations for installation of safety devices relative to this equipment, given expected human or vehicle reaction times defined by the physics-based rules 516), material selections capable of withstanding expected loads, piping configurations and tuning for a specified flow control application, wiring gauges suitable for an expected electrical load, minimum distances between signal wiring and electromagnetic field (EMF) sources to ensure negligible electrical interference on data signals, or other such design features that are dependent on physical rules.

In an example use case, relative locations of machines and devices specified by physical environment information submitted to the IDE system 202—e.g., as video or image data—can be used by the project generation component 206 to generate design data for an industrial safety system. For example, project generation component 206 can analyze measured or inferred distances between safety equipment and hazardous machines and, based on these measurements, determine suitable placements and configurations of safety devices and associated safety controllers that ensure the machine will shut down within a sufficient safety reaction time to prevent injury (e.g., in the event that a person runs through a light curtain). These safety device installation specifications can be recorded in system project 302 (e.g., in the engineering schematics, in the bill of materials, in the device configuration files, etc.).

In some embodiments, project generation component 206 can also analyze video or image data 604 of an existing machine to determine inline mechanical properties such as gearing or camming Project generation component 205 can factor this information into one or more guardrail templates 506 or design recommendations.

Figure 7:
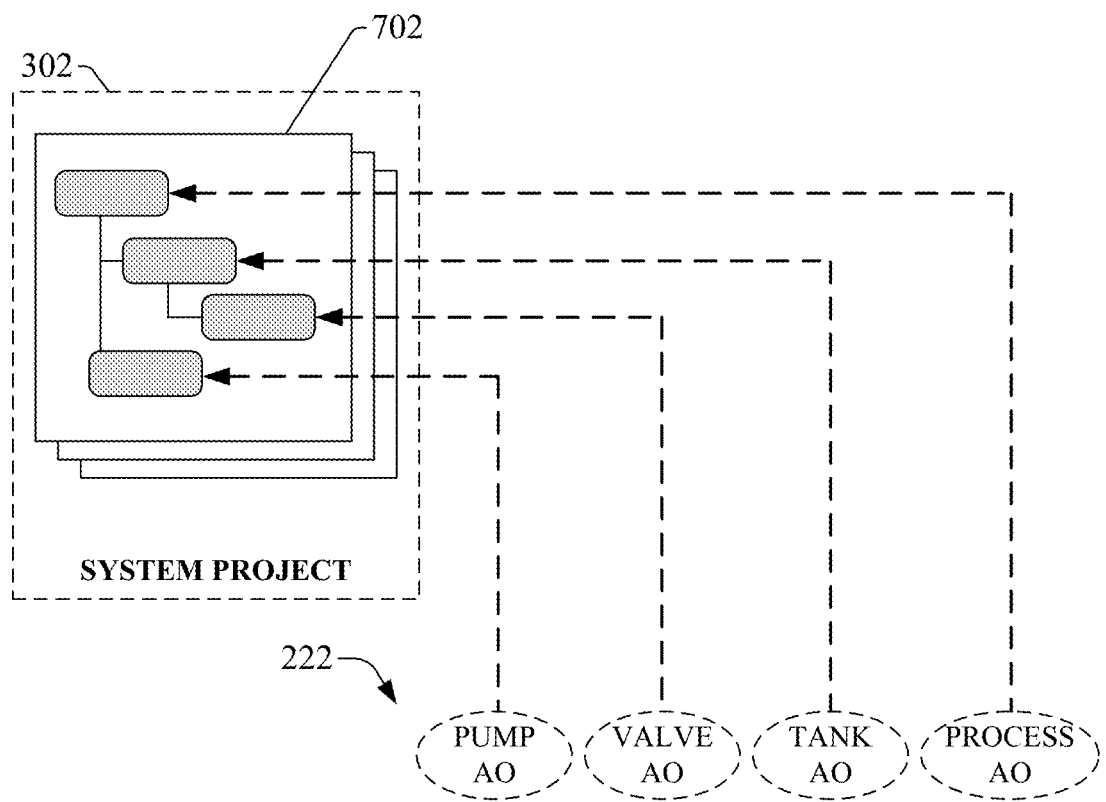
FIG. 7 is a diagram illustrating an example system project that incorporates automation objects into a project model.

As noted above, the system project 302 generated by IDE system 202 for a given automaton system being designed can be built upon an object-based architecture that uses automation objects 222 as building blocks. FIG. 7 is a diagram illustrating an example system project 302 that incorporates automation objects 222 into the project model. In this example, various automation objects 222 representing analogous industrial devices, systems, or assets of an automation system (e.g., a process, tanks, valves, pumps, etc.) have been incorporated into system project 302 as elements of a larger project data model 702. The project data model 702 also defines hierarchical relationships between these automation objects 222. According to an example relationship, a process automation object representing a batch process may be defined as a parent object to a number of child objects representing devices and equipment that carry out the process, such as tanks, pumps, and valves. Each automation object 222 has associated therewith object properties or attributes specific to its corresponding industrial asset (e.g., those discussed above in connection with FIG. 4), including executable control programming for controlling the asset (or for coordinating the actions of the asset with other industrial assets) and visualizations that can be used to render relevant information about the asset during runtime.

At least some of the attributes of each automation object 222 are default properties defined by the IDE system 202 based on encoded industry expertise pertaining to the asset represented by the objects. Other properties can be modified or added by the developer as needed (via design input 512) to customize the object 222 for the particular asset and/or industrial application for which the system projects 302 is being developed. This can include, for example, associating customized control code, HMI screens, AR presentations, or help files associated with selected automation objects 222. In this way, automation objects 222 can be created and augmented as needed during design for consumption or execution by target control devices during runtime.

Figure 8:
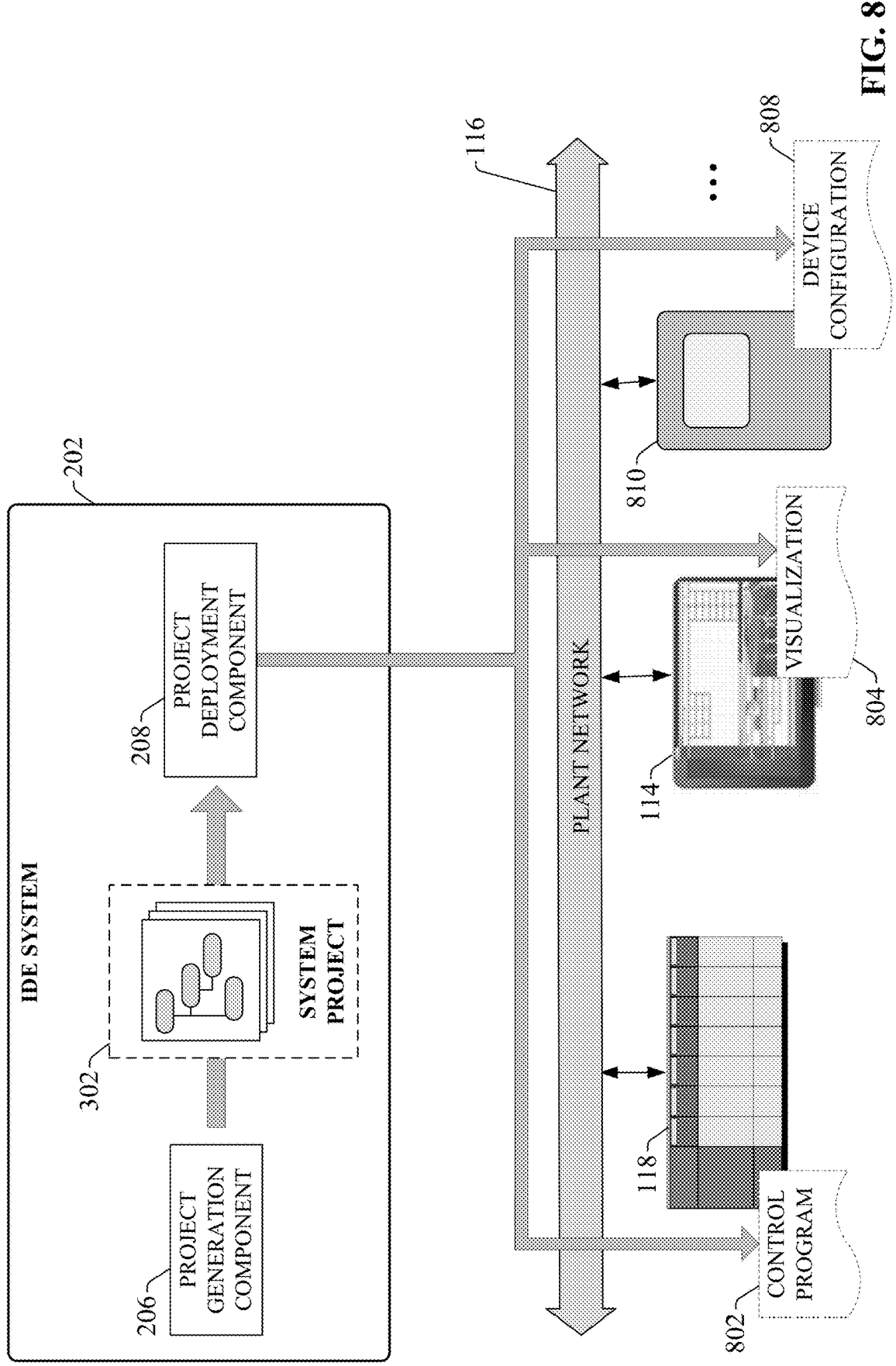
FIG. 8 is a diagram illustrating commissioning of a system project.

Once development on a system project 302 has been completed, commissioning tools supported by the IDE system 202 can simplify the process of commissioning the project in the field. When the system project 302 for a given automation system has been completed, the system project 302 can be deployed to one or more target control devices for execution. FIG. 8 is a diagram illustrating commissioning of a system project 302. Project deployment component 208 can compile or otherwise translate a completed system project 302 into one or more executable files or configuration files that can be stored and executed on respective target industrial devices of the automation system (e.g., industrial controllers 118, HMI terminals 114 or other types of visualization systems, motor drives 810, telemetry devices, vision systems, safety relays, etc.).

Conventional control program development platforms require the developer to specify the type of industrial controller (e.g., the controller's model number) on which the control program will run prior to development, thereby binding the control programming to a specified controller. Controller-specific guardrails are then enforced during program development which limit how the program is developed given the capabilities of the selected controller. By contrast, some embodiments of the IDE system 202 can abstract project development from the specific controller type, allowing the designer to develop the system project 302 as a logical representation of the automation system in a manner that is agnostic to where and how the various control aspects of system project 302 will run. Once project development is complete and system project 302 is ready for commissioning, the user can specify (via user interface component 204) target devices on which respective aspects of the system project 302 are to be executed. In response, an allocation engine of the project deployment component 208 will translate aspects of the system project 302 to respective executable files formatted for storage and execution on their respective target devices.

For example, system project 302 may include—among other project aspects—control code, visualization screen definitions, and motor drive parameter definitions. Upon completion of project development, a user can identify which target devices—including an industrial controller 118, an HMI terminal 114, and a motor drive 810—are to execute or receive these respective aspects of the system project 302. Project deployment component 208 can then translate the controller code defined by the system project 302 to a control program file 802 formatted for execution on the specified industrial controller 118 and send this control program file 802 to the controller 118 (e.g., via plant network 116). Similarly, project deployment component 208 can translate the visualization definitions and motor drive parameter definitions to a visualization application 804 and a device configuration file 808, respectively, and deploy these files to their respective target devices for execution and/or device configuration.

In general, project deployment component 208 performs any conversions necessary to allow aspects of system project 302 to execute on the specified devices. Any inherent relationships, handshakes, or data sharing defined in the system project 302 are maintained regardless of how the various elements of the system project 302 are distributed. In this way, embodiments of the IDE system 202 can decouple the project from how and where the project is to be run. This also allows the same system project 302 to be commissioned at different plant facilities having different sets of control equipment. That is, some embodiments of the IDE system 202 can allocate project code to different target devices as a function of the particular devices found on-site. IDE system 202 can also allow some portions of the project file to be commissioned as an emulator or on a cloud-based controller.

As an alternative to having the user specify the target control devices to which the system project 302 is to be deployed, some embodiments of IDE system 202 can actively connect to the plant network 116 and discover available devices, ascertain the control hardware architecture present on the plant floor, infer appropriate target devices for respective executable aspects of system project 302, and deploy the system project 302 to these selected target devices. As part of this commissioning process, IDE system 202 can also connect to remote knowledgebases (e.g., web-based or cloud-based knowledgebases) to determine which discovered devices are out of date or require firmware upgrade to properly execute the system project 302. In this way, the IDE system 202 can serve as a link between device vendors and a customer's plant ecosystem via a trusted connection in the cloud.

Copies of system project 302 can be propagated to multiple plant facilities having varying equipment configurations using smart propagation, whereby the project deployment component 208 intelligently associates project components with the correct industrial asset or control device even if the equipment on-site does not perfectly match the defined target (e.g., if different pump types are found at different sites). For target devices that do not perfectly match the expected asset, project deployment component 208 can calculate the estimated impact of running the system project 302 on non-optimal target equipment and generate warnings or recommendations for mitigating expected deviations from optimal project execution.

Figure 9:
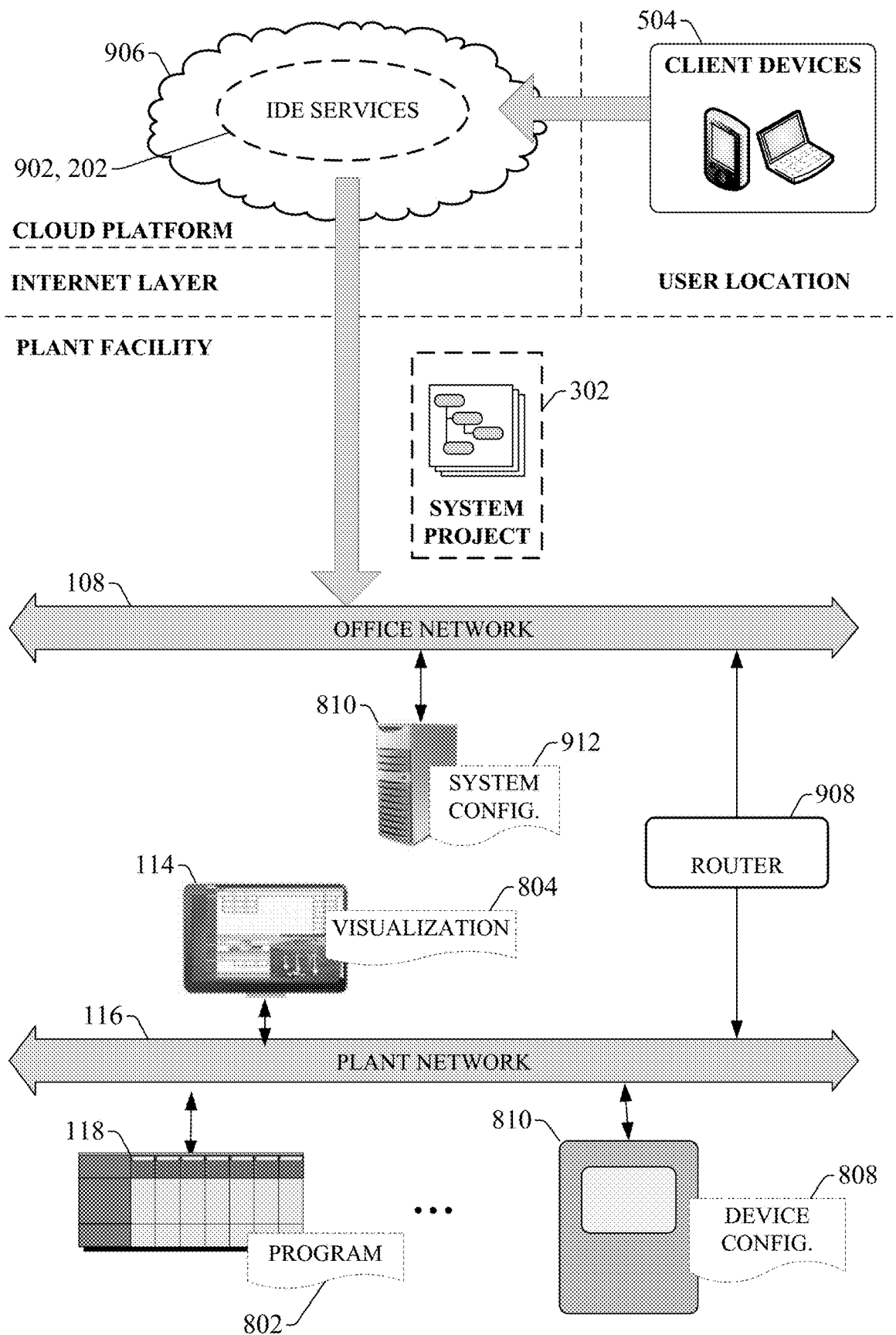
FIG. 9 is a diagram illustrating an example architecture in which cloud-based IDE services are used to develop and deploy industrial applications to a plant environment.

As noted above, some embodiments of IDE system 202 can be embodied on a cloud platform. FIG. 9 is a diagram illustrating an example architecture in which cloud-based IDE services 902 are used to develop and deploy industrial applications to a plant environment. In this example, the industrial environment includes one or more industrial controllers 118, HMI terminals 114, motor drives 810, servers 901 running higher level applications (e.g., ERP, MES, etc.), and other such industrial assets. These industrial assets are connected to a plant network 116 (e.g., a common industrial protocol network, an Ethernet/IP network, etc.) that facilitates data exchange between industrial devices on the plant floor. Plant network 116 may be a wired or a wireless network. In the illustrated example, the high-level servers 910 reside on a separate office network 108 that is connected to the plant network 116 (e.g., through a router 908 or other network infrastructure device).

In this example, IDE system 202 resides on a cloud platform 906 and executes as a set of cloud-based IDE service 902 that are accessible to authorized remote client devices 504. Cloud platform 906 can be any infrastructure that allows shared computing services (such as IDE services 902) to be accessed and utilized by cloud-capable devices. Cloud platform 906 can be a public cloud accessible via the Internet by devices 504 having Internet connectivity and appropriate authorizations to utilize the IDE services 902. In some scenarios, cloud platform 906 can be provided by a cloud provider as a platform-as-a-service (PaaS), and the IDE services 902 can reside and execute on the cloud platform 906 as a cloud-based service. In some such configurations, access to the cloud platform 906 and associated IDE services 902 can be provided to customers as a subscription service by an owner of the IDE services 902. Alternatively, cloud platform 906 can be a private cloud operated internally by the industrial enterprise (the owner of the plant facility). An example private cloud platform can comprise a set of servers hosting the IDE services 902 and residing on a corporate network protected by a firewall.

Cloud-based implementations of IDE system 202 can facilitate collaborative development by multiple remote developers who are authorized to access the IDE services 902. When a system project 302 is ready for deployment, the project 302 can be commissioned to the plant facility via a secure connection between the office network 108 or the plant network 116 and the cloud platform 906. As discussed above, the industrial IDE services 902 can translate system project 302 to one or more appropriate executable files—control program files 802, visualization applications 804, device configuration files 808, system configuration files 912—and deploy these files to the appropriate devices in the plant facility to facilitate implementation of the automation project.

Figure 10:
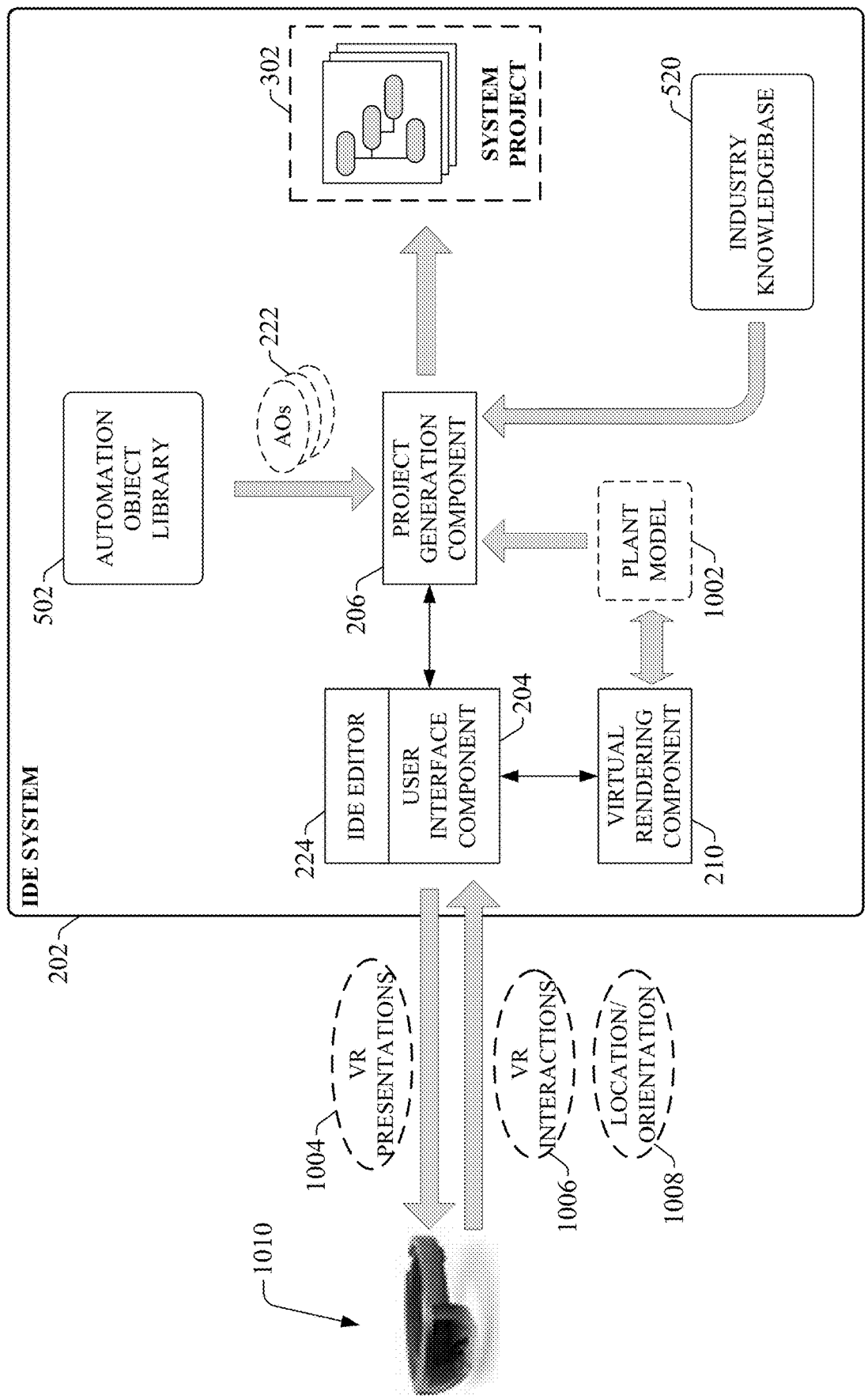
FIG. 10 is a diagram illustrating example data flows associated with creation of a system project for an automation system based on a user's interactions with a virtual reality presentation of a plant.

As noted above, some embodiments of the industrial IDE system 202 can generate portions of system project 302 based on design input 512 received as user interactions with a virtual representation of the industrial facility or installation area. FIG. 10 is a diagram illustrating example data flows associated with creation of a system project 302 for an automation system based on a user's interactions with a VR presentation of a plant. In this example, a wearable AR/VR appliance 1010 can interface with industrial IDE system 202 via user interface component 204, which may comprise a wired or wireless network interface, a near-field communication interface, or other such device interface suitable for the particular platform on which the IDE system 202 is implemented. In some embodiments, user interface component 204 may be configured to verify an authorization of the wearable appliance 1010 to access the IDE system 202 prior to allowing VR presentations to be delivered to the wearable appliance 1010. User interface component 204 may authenticate the wearable appliance 1010 or its owner using password verification, biometric identification (e.g., retinal scan information collected from the user by the wearable appliance 1010 and submitted to the user interface component 204), cross-referencing an identifier of the wearable appliance 1010 with a set of known authorized devices, or other such verification techniques.

User interface component 204 has an associated virtual rendering component 210 configured to generate virtual reality presentation data 1004 to wearable appliance 1010 for delivery by user interface component 204. Presentation data 1004, when received and executed by wearable appliance 1010, renders an interactive three-dimensional (3D) virtual reality presentation of an industrial area on the wearable appliance's display. To facilitate generating a virtual representation of an industrial area (e.g., a portion of an industrial facility in which the automation system being designed is to be installed or modified), IDE system 202 can maintain one or more plant models 1002 that define a visual representation of the physical layout of the area represented by the VR presentation data 1004. For example, a plant model 1002 for a given industrial area (e.g., a production area, a workcell, an assembly line, etc.) can define graphical representations of the industrial assets—including machines, conveyors, control cabinets, and/or industrial devices—located within that area, as well as the physical relationships between these industrial assets. For each industrial asset, the plant model 1002 can define physical dimensions and colors for the asset, as well as any animation supported by the graphical representation (e.g., color change animations, position animations that reflect movement of the asset, etc.). The plant models 1002 also define the physical relationships between the industrial assets, including relative positions and orientations of the assets on the plant floor, conduit or plumbing that runs between the assets, and other physical definitions.

In some embodiments, the plant model 1002 may be a digital twin of an existing plant or may be generated based in part of such a digital twin. Also, in some embodiments, at least a portion of plant model 1002 may be generated based on environmental properties of an installation area extracted from video or image data 604 (see FIG. 6). In such embodiments, information regarding industrial assets, physical obstacles, distances, locations, or other environmental features discovered by the image analysis component 214 based on analysis of video or image data can be fed to the plant model 1002 so that these environmental features are represented in the model 1002.

A rendering engine supported by virtual rendering component 210 is configured to generate an interactive VR presentation of the industrial area based on the industrial asset rendering definitions specified in the plant model 1002.

User interface component 204 delivers the resulting VR presentation to wearable appliance 1010 as VR presentation data 1004.

Figure 11A:
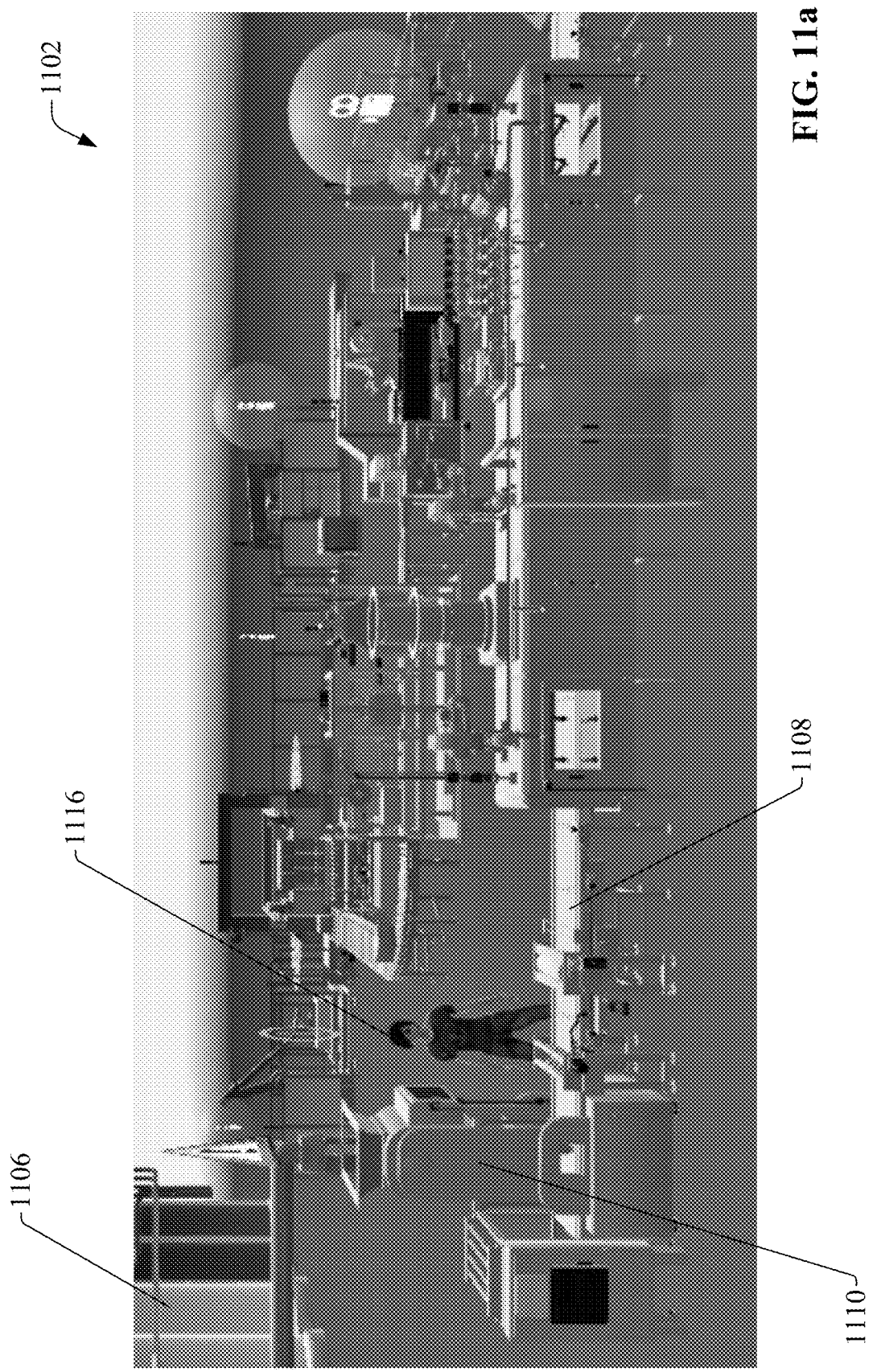
FIG. 11a is a partial rendition of an example virtual reality presentation depicting a first-person perspective of an industrial area, which can be generated by a virtual rendering component of an industrial IDE system.
Figure 11B:
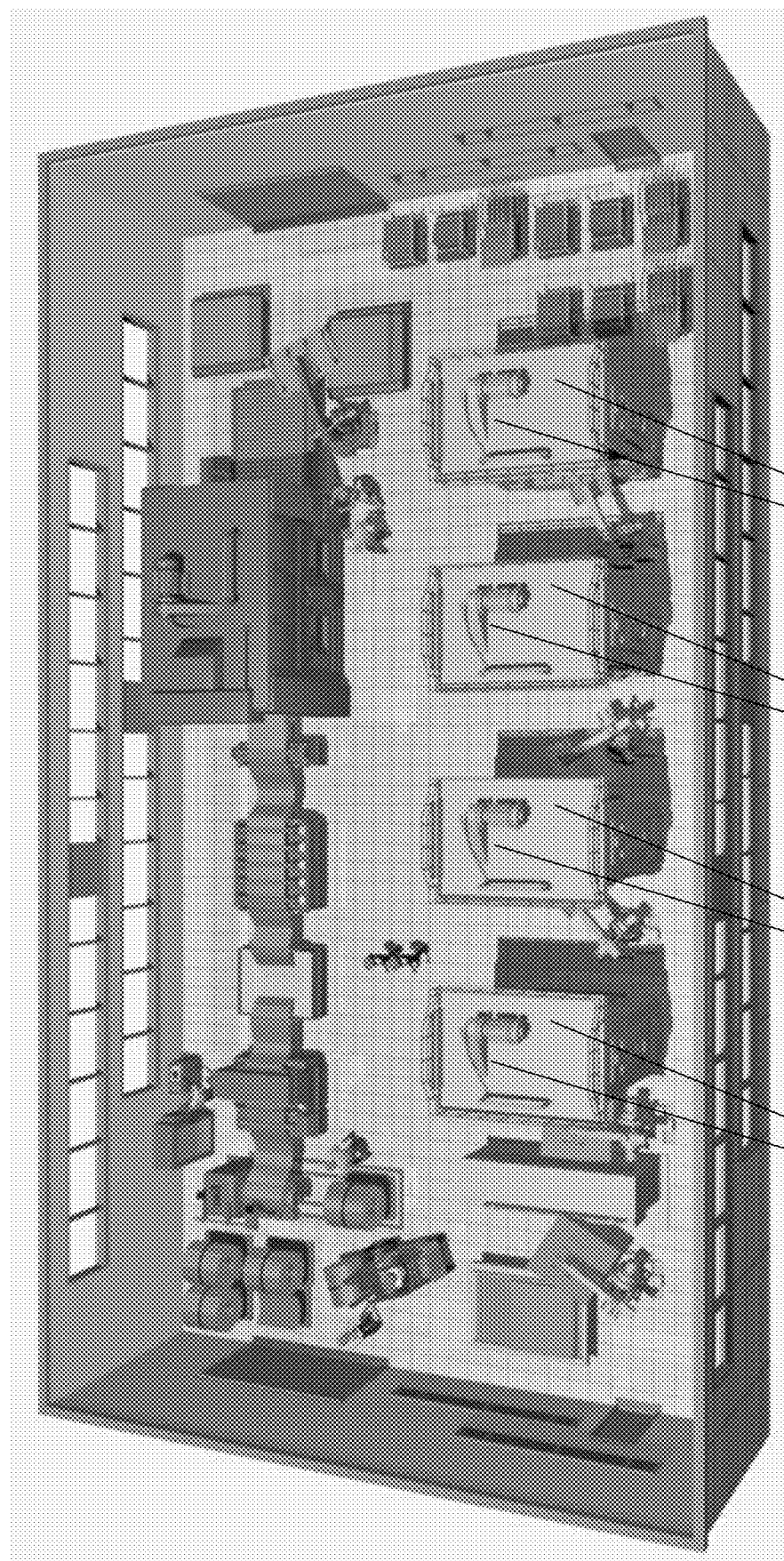
FIG. 11b is a rendition of another example virtual reality presentation depicting an external perspective of an industrial area, which can be generated by the virtual rendering component of the industrial IDE system.

FIG. 11a is a partial rendition of an example virtual reality presentation 1102 depicting a first-person perspective of an industrial area, which can be generated by virtual rendering component 210. FIG. 11b is a rendition of another example virtual reality presentation 1104 depicting an external perspective of an industrial area, which can also be generated by virtual rendering component 210. It is to be appreciated that, due to the constraints inherent in presenting virtual reality presentations via two-dimensional drawings, the example VR presentations illustrated in FIGS. 11a-11b cannot fully depict the VR presentations that are rendered on suitable wearable appliances. In general, the VR presentations rendered by wearable appliances 1010 provide surrounded virtual renderings encompass the user's entire field of view, and transition their line of sight or perspective as the user's location and orientation change. The partial renditions and associated descriptions herein seek to convey the virtual reality renderings and interactions to the degree possible given the limitations of two-dimensional illustrations.

In some embodiments, virtual rendering component 210 can support both external VR views of the industrial area from the perspective of a person outside of the area (as in example presentation 1104), as well as first-person views of the area that simulate the user's presence within the industrial area by rendering a full-scale view of the area (as in example presentation 1102). Users can selectively toggle between these two types of views and provide design input by manually interacting with either of the two views. Virtual rendering component 210 can stream up-to-date VR presentation data 1004 to wearable appliance 1010 to ensure that the view—including the user's angle of perspective—remains current. Virtual rendering component 210 renders industrial assets the VR presentation in accordance with rendering instructions defined by the plant model 1002. Industrial assets that can be rendered as virtual objects within the VR presentation can include, but are not limited to, tanks 1106, conveyors 1108, machines 1110, industrial robots, safety gates, generators, industrial controllers or devices, or other such assets.

The viewing perspective of the VR presentation generated by the virtual rendering component 210 is based on location and orientation data 1008 received by IDE system 202 from the wearable appliances 1010. In this regard, a location and orientation component of wearable appliance 1010 can be configured to determine a current geographical location, orientation, and line of sight of the appliance 1010. In some embodiments, appliance 1010 can leverage global positioning system (GPS) technology to determine the user's absolute location, or may be configured to exchange data with positioning sensors in order to determine the user's relative location. Wearable appliance 1010 can also include orientation sensing components that measure the wearable appliance's current orientation in terms of the direction of the appliance's line of sight, the angle of the appliance 1010 relative to horizontal, etc. Other types of sensors or algorithms can be supported by embodiments of the wearable appliance 1010 for determining a wearer's current location and orientation, including but not limited to inertial measurement units (IMUs) or visual-inertial odometry (VIO). The wearable appliance 1010 can report the location and orientation information to the IDE system 202 as location and orientation data 1008.

Location and orientation data 1008 is used by virtual rendering component 210 to control the point of view of the VR presentation. For example, a user may be viewing a VR presentation of an industrial area (e.g., the first-person presentation depicted in FIG. 11a or the external presentation depicted in FIG. 11b) via the user's wearable appliance 1010. Virtual rendering component 210 receives location and orientation data 1008 generated by the user's wearable appliance 1010 and renders the presentation in accordance with the user's current location and orientation. In particular, the direction and angle of the viewing perspective of the VR presentation is a function of the user's location and orientation.

In contrast to the first-person view (e.g., presentation 1102 of FIG. 11a), the external view generated by IDE system 202 (e.g., presentation 1104 of FIG. 11b) renders the industrial area as a virtual down-scaled model of the area, and allows the user to move around and interact with the scaled version of the area. As the user moves around, toward, or away from the virtual scaled industrial area, the wearable appliance 1010 streams updated location and orientation data 1008 to the IDE system 202, which updates the VR presentation data 1004 substantially continuously to simulate the effect of walking around a scale model of the production area.

Returning to FIG. 10, IDE system 202 can generate at least a portion of system project 302—including program code, visualizations, device configurations, device configurations, engineering drawings, bills of materials, etc.—based on VR interaction data 1006 generated by wearable appliance 1010 representing the user's manual interactions with one or both of the first-person VR presentation or the external VR presentation generated by virtual rendering component 210. For example, once the VR presentation of a production area is rendered on wearable appliance 1010, the wearer of appliance 1010 (e.g., a system designer) can manually interact with the rendered VR environment to select and place new industrial devices, machines, equipment, or other industrial assets (e.g., pumps, valves, conduit, safety guarding, etc.) within the virtual environment. To this end, some embodiments of user interface component 204 can render, as overlays within the VR presentation, menus from which various types of industrial assets can be selected (e.g., controllers, motor drives, vats, pumps, valves, industrial robots, conveyor, machining stations, die case furnaces, etc.). The wearer of appliance 1010 can manually interact with these menus using gestures within the VR presentation to select digital representations of desired assets and place the assets at selected locations within the VR environment (e.g., by performing a manual hold and place action). Virtual icons representing the industrial assets can be oriented, moved from one location to another, or removed from the virtual environment using appropriate gestures relative to the virtual assets (e.g., by performing gestures that simulate manually manipulating the virtual assets within the environment). The user's interactions within the VR environment are monitored by the wearable appliance 1010 and sent to the IDE system 202 as VR interaction data 1006.

Within the IDE environment, industrial assets added or moved in this manner can be represented by automation objects 222 corresponding to those assets (e.g., a tank automation object, a valve automation object, etc.). When a user adds a new industrial asset to the VR environment, project generation component 206 can identify the newly added asset and add an appropriate automation object 222 corresponding to the asset to the system project 302. As in other examples described above, the automation object 222 can be selected from the library 502 of standard automation objects maintained by the IDE system 202. Project generation component 206 can also generate sequencing control code for these assets as they are added and linked together within the virtual design environment, where this sequencing code may be based in part on corresponding predefined code modules 508 corresponding to the asset or control code associated with the automation objects 222 themselves.

In other example interactions, the user may act out, in gestures, motions that a new robot or other type of motion device is to perform. For example, the user may perform gestures that manually trace trajectories or motions to be carried out by a robot to facilitate picking and moving a part from a first location to a second location, or may perform gestures indicating a path of motion to be traversed by a motion device during a work cycle. In another example, the user may perform a manual gesture indicating that water is to be pumped from one specified tank to another tank. In response to such actions by the designer—reported as VR interaction data 1006 by the wearable appliance 1010—project generation component 206 will update the system project 302 by generating suitable code, device configurations, drawings, and visualizations that support these design goals and specifications.

Design interaction with the VR environment can be carried out within either the first-person perspective view (e.g., FIG. 11*a*) or the external view (e.g., FIG. 11*b*). In general, the first-person view may allow the designer to more easily perform design interactions directed to a specific production line or machine; e.g., by adding conveyors, machines, pumps, values, etc. Interactive inputs directed to larger-scale design aspects may be more easily performed using the external view. Design interactions that may be suitably performed using the external view may include, for example, adding duplicated instances of industrial robots or other industrial assets to respective multiple production areas (e.g., duplicated machines 1112*a*-1112*d* in production areas 1114*a*-1114*d*, as illustrated in FIG. 11*b*), moving industrial assets between production areas, or other such design actions. To add or move assets between production areas, the wearer of appliance 1010 can perform manual gestures relative to the external, down-scaled view of the production area to simulate grabbing, moving, and placing assets within the smaller virtual model of the plant facility.

Since the design workflow is performed within a virtual plant environment, some embodiments of IDE system 202 can execute graphical simulations of proposed control sequences and render these simulated control sequences within the VR presentation. This allows the designer to watch a virtual operation demonstrating how the proposed control sequence is expected to operate in the real world. These simulations can be executed based on modeled physical relationships represented by plant model 1002.

In addition to project data (e.g., code, visualizations, and other project components included in system project 302), some embodiments of project generation component 206 can also generate instructions regarding physical acts to be carried out on site in connecting with installing or programming the new equipment (e.g., demolition instructions, rewiring instructions, installations for installing new conduit, etc.). These instructions can be generated based in part on analysis of the plant model 1002—which records details of the existing physical environment at the installation site, including existing machines, control systems, physical barriers, etc. —and specifics of the new automation system recorded in system project 302.

The immersive VR design approach described above can also be used to automatically generate system project data for modifying existing production lines. For example, within the virtualized design environment, the designer may perform gestures that simulate grabbing and moving a pump from one location to another. In response, the project generation component 206 will generate new control code modify existing control code for updating control of the pump (as well as other pumps) based on the new location, generate instructions for physical acts to be carried out on-site in order to uninstall the pump from its original location and install the pump at the indicated new location (e.g. demolitions, installations, rerouting of pipes or wires, etc.), generate notifications of possibly unforeseen repercussions of the system that should be taken into consideration (e.g., unexpected changes in water pressure or load, redistribution of power, etc.), update engineering drawings and visualizations to reflect the relocation of the pump, or generate other such aspects of system project 302.

In some embodiments, project generation component 206 can leverage physics-based rules 516 and standards-based design considerations to identify changes that should be made to control code for existing industrial assets to accommodate a proposed addition or modification submitted by the designer via the virtualized design environment. For example, in response to receipt of VR interaction data 1006 proposing an addition of a new pump and valve to an existing automation system, project generation component 206 may recognize that the control timing of certain existing feed valves must be changed to ensure that the correct amount of fluid is provided. Accordingly, project generation component 206 will update the control code for these feed valves as needed to accommodate the new equipment the designer intends to install. Project generation component 206 can also identify what other configurations may need to be changed—e.g., time constants—and report these to the designer or incorporate the changes into the system project 302.

As noted above, the virtual design environment can allow the wearer of appliance 1010 to move virtualized industrial assets or other design components between locations within the virtual plant presentation; e.g., via manual gestures that simulate grabbing and moving equipment from a first location to a second location within the virtual design environment. Since IDE system 202 has knowledge of the existing control systems and the physical environment within the production area—e.g., based on the plant model 1002 and system project 302—project generation component 206 can also identify whether moving industrial equipment as indicated by the designer necessitates updates to controller I/O wiring, or if the equipment being moved should be wired to a different controller given the new physical location. Based on such determinations, project generation component 206 can make any appropriate updates to the system project 302, including but not limited to updating I/O drawings, updating wiring schedules, updating control panel layout drawings and corresponding bills of material, updating controller programming (e.g., by de-associating the control code for controlling the moved asset from its original controller and associating the control code with the new controller), or other such changes to the project. Project generation component 206 can also identify electrical repercussions associated with moving the equipment or adding new equipment as proposed by the designer, such as power drops, overloading a power supply line, etc. Based on these identified electrical concerns, the project generation component 206 can implement appropriate updates to the system project 320 (e.g., updating wiring schedules, redistributing electrical equipment between power supplies, etc.).

Design changes that can be made within the virtual environment can also include modifications to existing piping used to transfer material. For example, using appropriate interactive gestures within the VR presentation, the designer can indicate that a length section of pipe is to be removed. In response, project generation component 206 can determine a design strategy for re-configuring and retuning the control system (e.g., retuning a control loop that controls flow through the pipe) to ensure proper flow after removal of the pipe as indicated. Determining a proper reconfiguration and tuning may involve referencing physics-based rules 516 in order to estimate flows and pressures, which may be necessary in order to simulate transfer of material through the new piping scheme and to estimate a suitable retuning of the control loop based on results of the simulation.

In some embodiments, the IDE system's virtual design environment can also assist with design and preliminary testing of industrial safety systems. For example, the digital plant model 1002 can include models of existing or proposed safety devices and guarding that are part of a zone-based safety system. This safety equipment can include, but is not limited to, guard door switches, operator access points, safety fencing or gating, light curtains, safety mats, safety pull cords or emergency stop buttons, etc. The IDE system's simulation component 212 can simulate movement of parts and operators within the digitized representation of the plant or production area—including simulation of the safety system behavior—to confirm that the production sequence will be performed safely. In some embodiments, simulation component 212 can perform this simulation in the background as the designer is arranging and configuring the proposed safety equipment within the virtual design environment, and present dynamic feedback via the VR presentation indicating whether the developer's proposed safety solution will work reliably. This can include estimating the safety integrity level (SIL) rating of the proposed system and indicating whether the system meets vertical-specific safety requirements. This approach can also be applied to the design of motion systems in some embodiments. For example, a designer may submit design input via VR interaction data 1006 that cams two axes together, and the simulation component 212 can dynamically confirm that a desired motion profile will be achieved. In general, the IDE system's dynamic simulation features can allow both design and testing to be performed in parallel in this manner.

In some embodiments, the project generation component 206 can also analyze the plant model 1002 and the design data submitted by the developer (e.g., design input 512 and/or VR interaction data 1006) and determine, based on this analysis, a number of operators or workers of other roles that will be needed to operate and/or maintain the new or modified automation system. Project generation component 206 can create objects within the plant model 1002 representing these anticipated workers, and virtual rendering component 210 can render human icons 1116 representing these workers within the VR presentation. User interface component 204 can also report this workforce recommendation to the designer as a consideration.

The digital plant model 1002 used as the basis for the virtual design environment can be generated in a number of ways. According to one approach in which an existing plant is to be imported into the industrial IDE system 202 for the purposes of upgrading or expanding existing machines or production lines, a crawler can be deployed that models the existing plant and adds discovered elements to the virtual design environment. The crawler can traverse the plant to identify data, equipment, and other assets and build the digital model as a topology view of the existing systems. According to another approach, an audit of a user's existing system can be performed by walking through the plant with a wearable AR/VR appliance (e.g., appliance 1010), which collects visual and scanned information used to build the digital model 1002. The scanned data can include not only machines and other industrial assets, but also pipes, conduits, cable feed links, and other physical entities within the environment. Tags or supplemental information can be added to the model 1002 dynamically by the wearer of the appliance 1010 using voice or gestures. This can yield at least a skeletal structure for the plant model 1002 which can be further enhanced with historical or real-time data.

Plant model 1002 can also estimate and record electrical and mechanical characteristics of the plant environment based on identification of electrical cable feeds and their calculated distances, gear boxes, mounting patterns, etc. These estimated characteristics can include impedances across cables detected during the audit, gearing ratios (e.g., obtained by counting teeth in an image or video of a gear box), stresses, voltage drops, interferences, mechanical loads, etc. Estimates of mechanical load can be determined based on recognition and analysis of mechanical linkages (e.g., by estimating load based on whether a prime mover is going through a gear box or a belt-driven system). Physical relationships between power and data cables—both existing and planned or designed cabling—can also be identified and leveraged by the IDE system 202 to generate design recommendations; e.g., recommending shielded cable where appropriate, indicating suitable junction box locations, recommending moving a data cable tray away from nearby power cabling, etc. In general, industrial IDE system 202 not only captures dimensionality for the plant model 1002 but also applies industrial expertise to generate recommendations about the existing or proposed plant design.

In some embodiment image analysis component 214 can translate images from 2D or 3D cameras (e.g., video or image data 604) to automation objects 222 that can be added to the plant model 1002. In such embodiments, image analysis component 214 can analyze the image data 604 to identify objects, spaces, and distances recorded in the image data 604, and this environmental information can be incorporated into the plant model 1002. Portions of the plant model 1002 can also be built by translating engineering drawings (e.g., CAD files) to automation objects 222 and associated linkages. Elements in the digital plant model 1002 can be linked to automation objects 222, which themselves can be linked to or associated with 3D or 2D visualizations, alarms, control coding, startup procedures, validation reports, simulations, documentation, and other such properties associated with the industrial asset represented by the object (e.g., properties described above in connection with FIG. 4). Automation objects can also be geotagged with location information identifying the location of the associated asset.

After the design of the new or modified industrial control system is complete, the resulting system project 302—generated based at least in part on the design input submitted via the designer's interactions with the VR presentation of the installation site—can be deployed as described above in connection with FIGS. 8 and 9.

Figure 12:
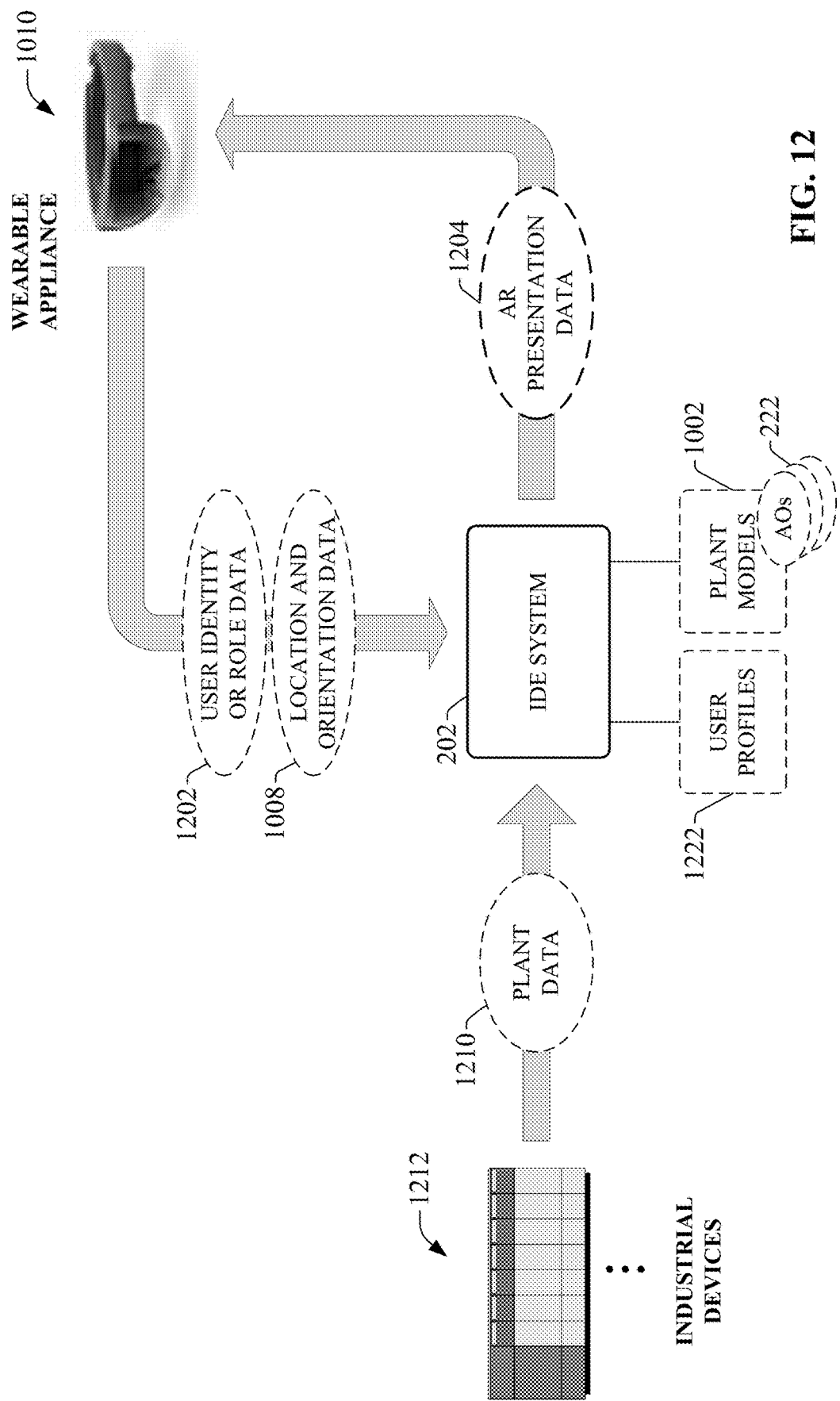
FIG. 12 is a diagram illustrating data inputs leveraged by an industrial IDE system to generate augmented reality (AR) presentations after commissioning of the designed automation system.

In some embodiments, the automation objects 222 that make up the digital plant model 1002 can be leveraged to present customized augmented reality (AR) presentations to a user during runtime of the new automation system designed using IDE system 202 after the new system has been commissioned. The AR presentation can be generated based on a combination of diverse information received and processed by virtual rendering component 210. FIG. 12 is a diagram illustrating data inputs leveraged by IDE system 202 to generate AR presentations after commissioning of the designed automation system. IDE system 202 can collect plant data 1210 from industrial devices or systems 1212 across the plant environment. IDE system 202 also maintains the plant models 1002 used to generate the virtual design environment within which the designer generated at least a portion of the system project 302.

A rendering engine supported by virtual rendering component 210 is configured to generate an interactive AR presentation of the industrial area based on the rendering definitions specified in the plant models 1002. Virtual rendering component 210 populates this augmented reality presentation with selected subsets of collected plant data 1210 (as well as production or operational statistics calculated based on subsets of the plant data 1210), and the IDE system's user interface component 204 delivers the resulting aggregate AR presentation to wearable appliance 206 as AR presentation data 1204. Virtual rendering component 210 can generate the presentation such that items of the plant data 1210 are overlaid at locations within the user's field of view that place the data items on or near graphical representations of the industrial assets to which the data items relate.

The subset of plant data selected for rendering on appliance 1010 at a given time, as well as the locations at which the data is rendered, is a function of the location and orientation data 1008 indicating the appliance's current location, orientation, and line of sight. The data presented may also be a function of the wearer's identity or role (as indicated by user identity or role data 1202 received from the wearable appliance 1010). This identity or role data 1202 can be cross-referenced with user profiles 1222, which define the types or sets of information that respective users or user roles are permitted to view. Roles for which customized views can be defined can include, but are not limited to, operators, engineers, maintenance personnel, plant managers, accounting staff, etc.

Some embodiments of the automation objects 222 may include an AR attribute that defines a suitable AR presentation for the associated asset. For example, a tank automation object 222 may have associated code, widgets, documentation, schematics, etc. as well as an associated AR object that acts as a digital representation of the asset for visualization. This AR object can be linked to its corresponding physical asset (e.g., using a geotagged location property of the automation object) such that its AR representation follows the asset even if the asset changes locations.

With a virtual plant model 1002 that includes automation objects 222 representing assets that are virtualized within the model, a wearer of wearable appliance 1010 can initiate a mode that filters available AR data presented on the appliance 1010 according to types of information the wearer wishes to see during traversal of the plant. For example, the wearer may request that only data relating to existing alarms or performance problems be displayed on appliance 1010 as part of an AR presentation as the wearer traverses the plant floor. Other example data filtering modes can include a predictive maintenance mode that renders information relevant to maintenance issues, an energy consumption mode that renders energy utilization information for respective assets, a cleaning mode, or other such filtering modes. This AR data can be rendered on the wearable appliance 1010 as overlays within the user's field of view at locations within the field of view that place items of the AR data on or near the relevant industrial assets AR data presented via the wearable appliance 1010 can also be a function of the user's role (operator, engineer, plant manager, etc.).

In some embodiments, the IDE system's simulation component 212 can execute a virtual simulation of the physical automation system during runtime using the plant model 1002 that was built or updated during the design phase. This simulation can run in parallel to the real-world industrial assets and can be continually updated with historical or real-time data generated by and collected from the physical system. The simulation component 212 can monitor the physical system and compare performance with results of the model-driven simulation to identify possible performance degradations, including but not limited to equipment degradations, deviations from expected or preferred performance (e.g., deviations from defined key performance indicators indicative of acceptable performance), or other such performance issues. In some embodiments, the automation objects 222 that make up the plant model 1002 may include simulation attributes to facilitate such simulations.

Figure 13:
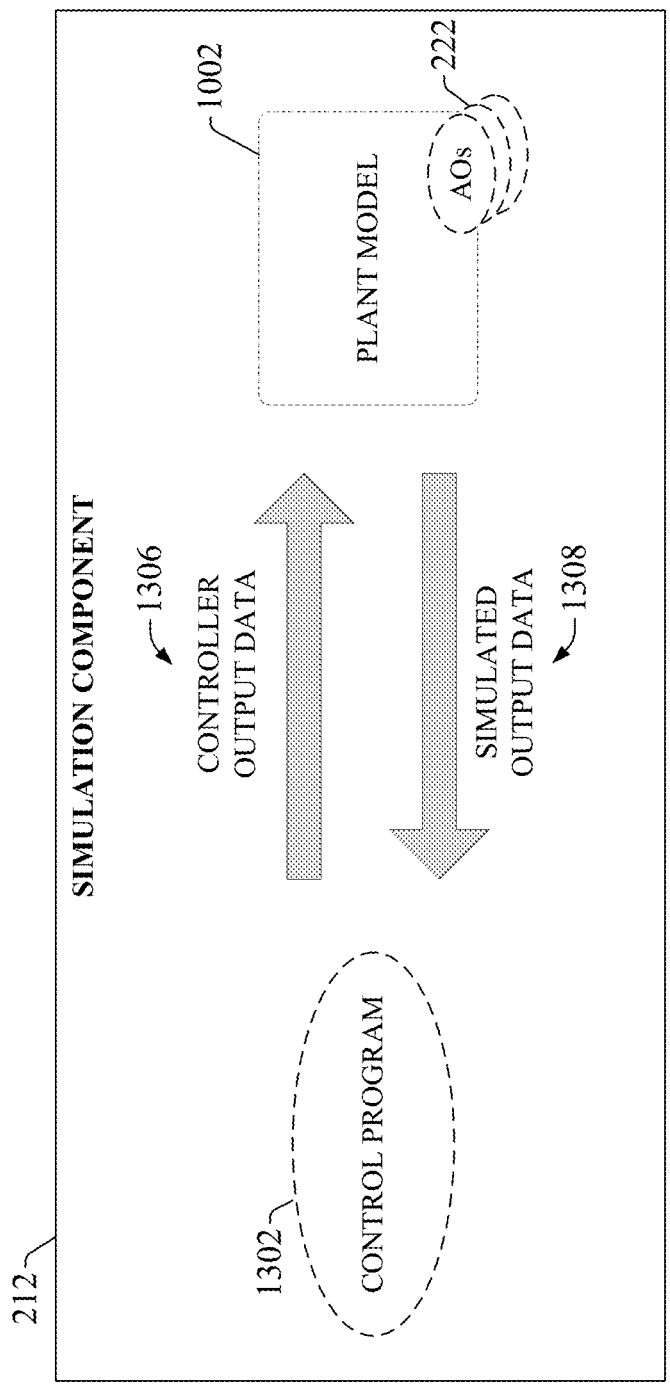
FIG. 13 is a generalized block diagram illustrating interactions between a control program being tested and a plant model.

Simulation component 212 can also perform simulations to test proposed control programming and verify that the control programming will perform as expected prior to deployment. To this end, some embodiments of the plant model 1002 may model not only the physical appearance, dimensions, and locations of industrial assets, but also certain behaviors of those assets (e.g., responses to control inputs in terms of movement, speed, temperatures, flows, fill levels, etc.). This can allow the digital plant model 1002 to act as a simulation environment for testing control programs or device configurations. FIG. 13 is a generalized block diagram illustrating interactions between a control program 1302 being tested and a plant model 1002. Control program 1302 may be a program submitted to the IDE system 202 for testing or may be a control program generated by the project generation component 206 as part of system project 302. In this example, simulation component 212 of the industrial IDE system 202 acts as an industrial controller emulator to execute control program 1302 against plant model 1002.

Plant model 1002 can simulate various aspects of the physical industrial automation system to be monitored and regulated by the control program 1302. Simulation component 212 can virtually interface control program 1302 with the plant model 1002 to exchange virtual I/O data in order to simulate real-world control. Control program 1302 can comprise any conceivable type of code used to process input signals read into a controller and to control output signals from the controller, including but not limited to ladder logic, sequential function charts, function block diagrams, or structured text. Control program 1302 is designed to regulate an automation system being modeled by plant model 1002. Plant model 1002 mathematically models the system to be regulated by generating digital and analog I/O values representing, for example, sensor outputs, metering outputs, or other plant data analogous to the data expected to be generated by the physical system being modeled. These inputs and outputs can be defined for each industrial asset by plant model 1002, and in some cases by the automation objects 222 representing the assets.

Simulation component 212 provides this simulated output data 1808 to the control program 1302, which receives this data as one or more virtual physical inputs. Control program 1302 processes these inputs according to user-defined algorithms, and generates digital and/or analog controller output data 1306 based on the processing. This output data 1306 represents the physical outputs that would be generated by a controller executing control program 1302 and transmitted to the hardwired field devices comprising the automation system (e.g., PID loop control outputs, solenoid energizing outputs, motor control outputs, etc.). The controller output data 1306 is provided to the appropriate input points of the plant model 1002, which updates the simulated output data 1308 accordingly. This simulation technique can be used to test and debug control programs without putting field equipment and machinery at risk, to simulate modifications to plant or machine operations and estimate how such modifications affect certain performance or financial metrics, or to perform other analytics.

Simulation component 212 can be configured to simulate execution of multiple control devices, including but not limited to industrial controllers, motor drives, and other such control devices. As more simulated control devices are integrated with the plant model 1002, a digital twin of the physical automation system can be realized. This digital twin can be used to test new control programs on virtualized equipment analogous to their real-world counterparts, perform predictive analytics to estimate asset maintenance or replacement schedules, or other such functions.

Embodiments of the industrial IDE system described herein that support a VR design environment can provide a more intuitive design interface relative to conventional approaches to interacting with IDE systems for development of industrial control applications, allowing developers to submit design input using naturalistic gestures within a three-dimensional VR presentation of the installation area which are then translated by the IDE system into executable control code, visualizations, device configurations, or other software aspects of an automation system project.

Figure 14:
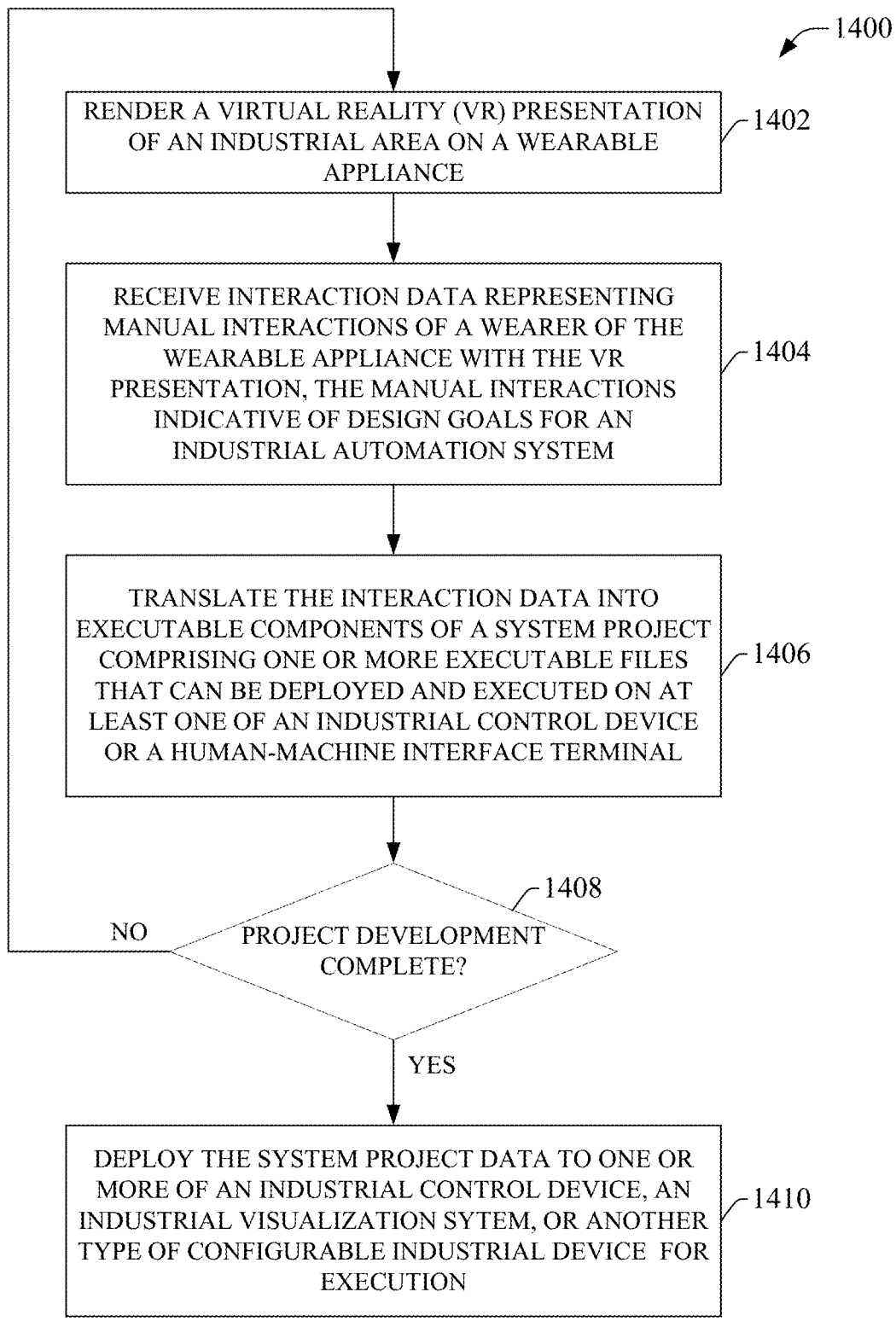
FIG. 14 is a flowchart of an example methodology for generating executable industrial automation project components via interaction with a virtual industrial design environment.

FIG. 14 illustrates a methodology in accordance with one or more embodiments of the subject application. While, for purposes of simplicity of explanation, the methodology shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 14 illustrates an example methodology 1400 for generating executable industrial automation project components via interaction with a virtual industrial design environment. Initially, at 1402, a virtual reality (VR) presentation of an industrial area is rendered on a wearable appliance. The VR presentation may comprise a 3D virtualization of an installation area within a plant facility in which a new automation system is to be installed, or an existing automation system is to be upgraded or modified. In some embodiments, the VR presentation can be toggled between a first-person view that simulates the wearer's presence within the installation area and an external view that renders the installation area as a virtual down-scaled model with which the user can virtually interact.

At 1404, interaction data representing manual interactions or gestures of a wearer of the wearable appliance with the VR presentation is received. The manual interactions represented by the interaction data can be indicative of the wearer's design goals for the industrial automation system being installed or modified. Interactions that can be represented by the interaction data can include, for example, gestures that simulate placement of industrial devices, machines, or other assets at selected locations within the virtual installation environment; gestures that simulate removal of such assets from the installation environment; gestures that simulate movement of an industrial asset from a first location to a second location (e.g., using a grab and move gesture); gestures that indicate placement of piping or conduit between two indicated locations; or other such VR interactions. In this regard, the wearer's interactions with the VR representation of the installation site are recognized and processed as design input specifying the structure and operational requirements of the automation system being designed or modified.

At 1406, the interaction data received at step 1404 is translated into executable components of a system project for the industrial automation device being designed. The executable components of the system project can comprise, for example, one or more executable files that can be deployed and executed on at least one of an industrial control device, an HMI terminal, an AR/VR visualization system, or other such target devices. The executable components are designed in accordance with the structure and operational requirements represented by the interaction data.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 15:
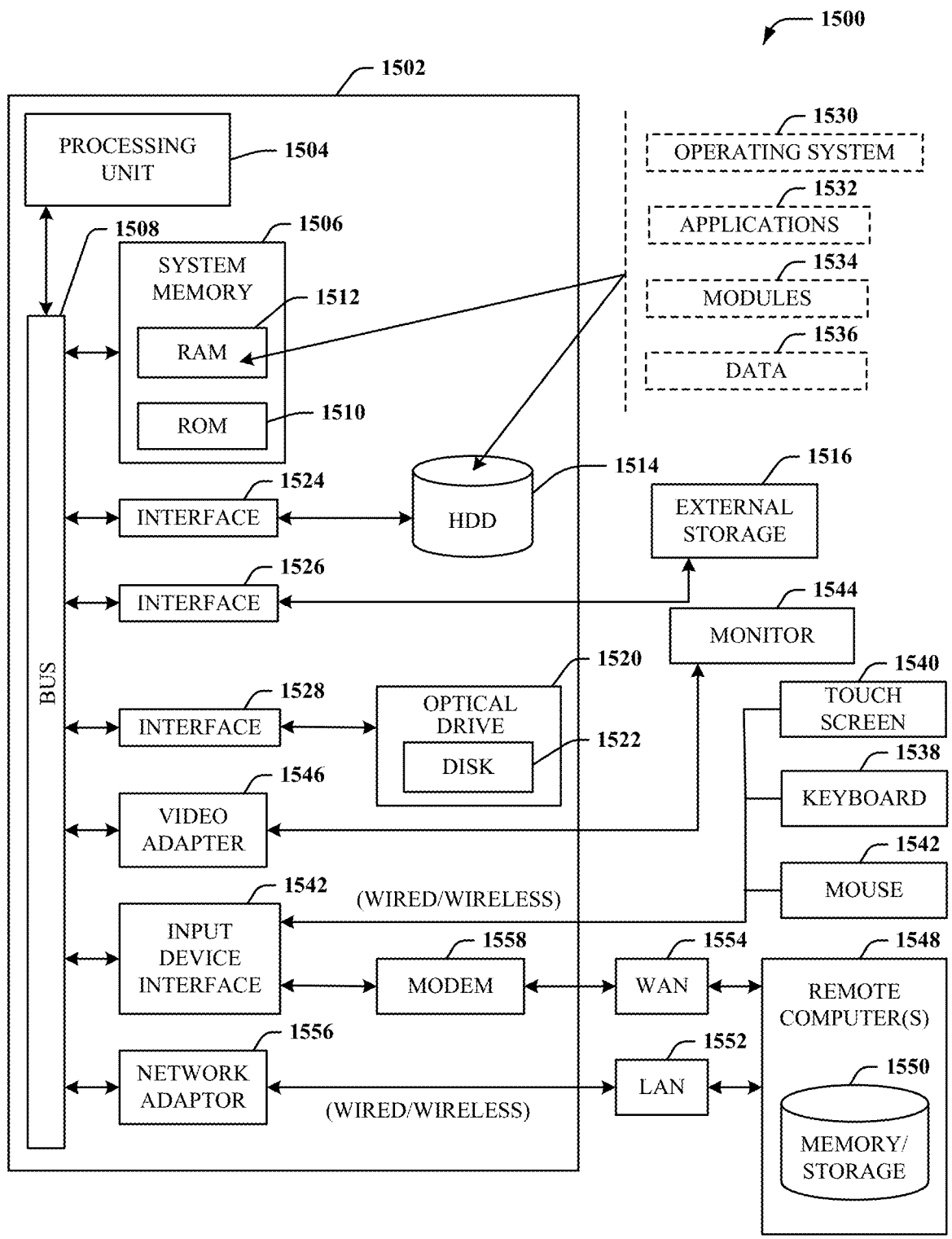
FIG. 15 is an example computing environment.
Figure 16:
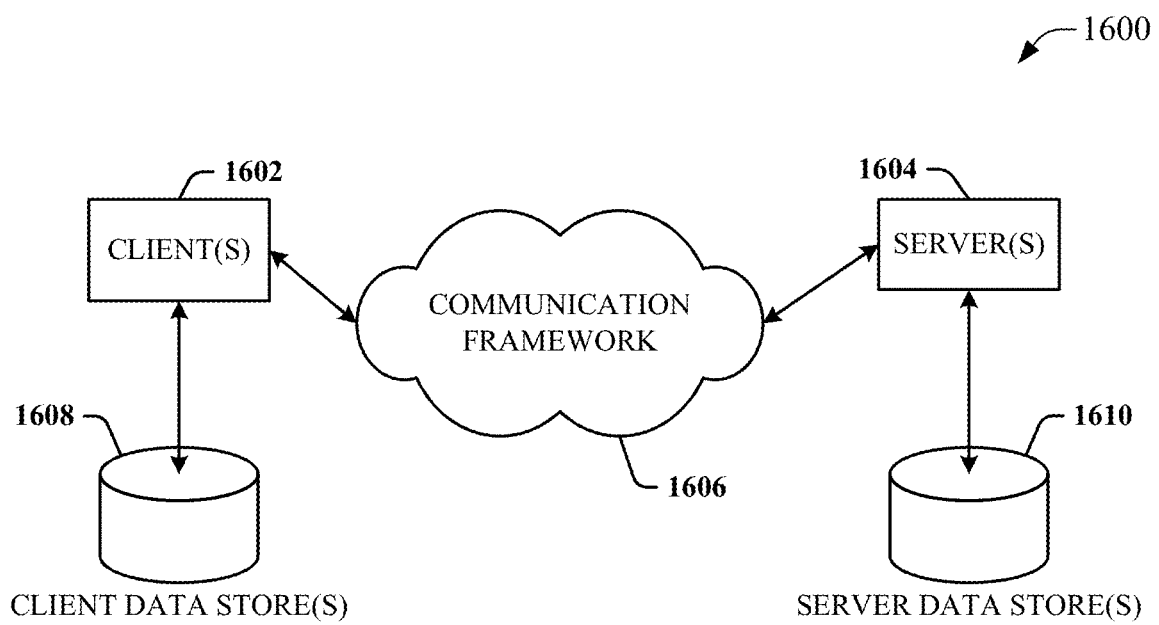
FIG. 16 is an example networking environment.

In order to provide a context for the various aspects of the disclosed subject matter, FIGS. 15 and 16 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and an optical disk drive 1520 (e.g., which can read or write from a CD-ROM disc, a DVD, a BD, etc.). While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514. The HDD 1514, external storage device(s) 1516 and optical disk drive 1520 can be connected to the system bus 1508 by an HDD interface 1524, an external storage interface 1526 and an optical drive interface 1528, respectively. The interface 1524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for application programs 1532. Runtime environments are consistent execution environments that allow application programs 1532 to run on any operating system that includes the runtime environment. Similarly, operating system 1530 can support containers, and application programs 1532 can be in the form of containers, which are lightweight, standalone, executable packages of software that include, e.g., code, runtime, system tools, system libraries and settings for an application.

Further, computer 1502 can be enable with a security module, such as a trusted processing module (TPM). For instance with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1544 or other type of display device can be also connected to the system bus 1508 via an interface, such as a video adapter 1546. In addition to the monitor 1544, a computer typically includes other peripheral output devices (not shown), such as speakers, printers, etc.

The computer 1502 can operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, e.g., a wide area network (WAN) 1554. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1552 through a wired and/or wireless communication network interface or adapter 1556. The adapter 1556 can facilitate wired or wireless communication to the LAN 1552, which can also include a wireless access point (AP) disposed thereon for communicating with the adapter 1556 in a wireless mode.

When used in a WAN networking environment, the computer 1502 can include a modem 1558 or can be connected to a communications server on the WAN 1554 via other means for establishing communications over the WAN 1554, such as by way of the Internet. The modem 1558, which can be internal or external and a wired or wireless device, can be connected to the system bus 1508 via the input device interface 1542. In a networked environment, program modules depicted relative to the computer 1502 or portions thereof, can be stored in the remote memory/storage device 1550. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1552 or WAN 1554 e.g., by the adapter 1556 or modem 1558, respectively. Upon connecting the computer 1502 to an associated cloud storage system, the external storage interface 1526 can, with the aid of the adapter 1556 and/or modem 1558, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 16 is a schematic block diagram of a sample computing environment 1600 with which the disclosed subject matter can interact. The sample computing environment 1600 includes one or more client(s) 1602. The client(s) 1602 can be hardware and/or software (e.g., threads, processes, computing devices). The sample computing environment 1600 also includes one or more server(s) 1604. The server(s) 1604 can also be hardware and/or software (e.g., threads, processes, computing devices). The servers 1604 can house threads to perform transformations by employing one or more embodiments as described herein, for example. One possible communication between a client 1602 and servers 1604 can be in the form of a data packet adapted to be transmitted between two or more computer processes. The sample computing environment 1600 includes a communication framework 1606 that can be employed to facilitate communications between the client(s) 1602 and the server(s) 1604. The client(s) 1602 are operably connected to one or more client data store(s) 1608 that can be employed to store information local to the client(s) 1602. Similarly, the server(s) 1604 are operably connected to one or more server data store(s) 1610 that can be employed to store information local to the servers 1604.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
a memory that stores executable components; and
a processor, operatively coupled to the memory, that executes the executable components, the executable components comprising:
a virtual rendering component configured to render an interactive virtual reality (VR) representation of an industrial facility based on a digital model of the industrial facility;
a user interface component configured to receive interaction data representing manual interactions with the VR representation of the industrial facility, wherein the manual interactions are indicative of design input that defines aspects of an industrial automation system and comprise at least one of a manual interaction defining placement of an industrial asset at a specified location within the VR representation, a manual interaction defining a relocation of an industrial asset from a first location within the VR representation to a second location within the VR representation, a manual interaction defining replication of an industrial asset across multiple locations within the VR representation, a manual interaction defining a trajectory to be carried out by a motion device, or a manual interaction defining a path through which material is to be transferred;
a project generation component configured to translate the interaction data into executable system project data that satisfies the design input represented by the manual interactions, wherein the system project data comprises at least an executable industrial control program configured to perform control of the industrial automation system; and
a simulation component configured to perform simulated control of the industrial automation system by the industrial control program based on exchange of virtual I/O data between the industrial control program and the digital model.

2. The system of claim 1, wherein the simulation component is further configured to determine whether the system project data satisfies the design input based on a result of the simulated control.

3. The system of claim 1, wherein the digital model models physical appearances of industrial assets that make up the industrial automation system and behaviors of the industrial assets in response to control inputs from an industrial controller.

4. The system of claim 1, wherein the system project data further comprises at least one of an industrial visualization application configured to visualize at least a portion of the industrial automation system, industrial device configuration data configured to set a configuration parameter of an industrial device, an engineering drawing, a wiring schedule, or a bill of materials.

5. The system of claim 1, wherein the user interface component is configured to selectively switch the VR representation between a first-person view that simulates the wearer's presence within the industrial facility and an external view that renders a down-scaled model view of the industrial facility.

6. The system of claim 1, wherein the project generation component is configured to, in response to a determination that the interaction data defines the placement of the industrial asset at the specified location within the VR representation, add an automation object representing the industrial asset to the system project data.

7. The system of claim 6, wherein the automation object has associated therewith at least one of an input, an output, an analytic routine, an alarm, a security feature, or a graphical representation of the industrial asset.

8. The system of claim 1, wherein
the digital model models the industrial facility and an existing automation system within the industrial facility, and
the project generation component is further configured to, in response to a determination that at least a portion of the design input indicated by the manual interactions necessitates a design modification to the existing automation system, generate the system project data to reflect the design modification.

9. The system of claim 8, wherein the design modification comprises at least one of a modification to a control program associated with the existing automation system, a rewiring of control signals or power lines associated with the existing automation system, or a retuning of a control loop associated with the existing automation system.

10. A method, comprising:
rendering, by an industrial integrated development environment (IDE) system comprising a processor, an interactive virtual reality (VR) presentation of an industrial area based on a digital model of an industrial facility;
receiving, by industrial IDE system, interaction data representing manual interactions with the VR presentation of the industrial area, wherein the manual interactions are indicative of design specifications for an industrial automation system and comprise at least one of a manual interaction defining placement of an industrial asset at a specified location within the VR presentation, a manual interaction defining a relocation of an industrial asset from a first location within the VR presentation to a second location within the VR presentation, a manual interaction defining replication of an industrial asset across multiple locations within the VR presentation, a manual interaction defining a trajectory to be carried out by a motion device, or a manual interaction defining a path through which material is to be transferred;
translating, by the industrial IDE system, the interaction data into executable system project data that satisfies the design specifications represented by the manual interactions, wherein the translating comprises translating the interaction data to at least an executable industrial control program configured to perform control of the industrial automation system; and
performing, by the industrial IDE system, simulated control of the industrial automation system by the industrial control program based on exchange of virtual I/O data between the industrial control program and the digital model.

11. The method of claim 10, wherein the translating comprises, in response to a determination that the interaction data represents the manual interaction defining placement of the industrial asset within the VR presentation, adding an automation object representing the industrial asset to the system project data.

12. The method of claim 10, wherein the performing of the simulated control comprises determining whether the system project data satisfies the design input based on a result of the simulated control.

13. The method of claim 10, wherein the digital model models physical appearances of industrial assets that make up the industrial automation system and behaviors of the industrial assets in response to control inputs from an industrial controller.

14. The method of claim 10, wherein the translating further comprises translating the interaction data to at least one of an industrial visualization application configured to visualize at least a portion of the industrial automation system, industrial device configuration data configured to set a configuration parameter of an industrial device, an engineering drawing, a wiring schedule, or a bill of materials.

15. The method of claim 10, wherein the rendering comprises selectively rendering the VR presentation as either of a first-person view that simulates the wearer's presence within the industrial area and an external view that renders a down-scaled model view of the industrial area.

16. A non-transitory computer-readable medium having stored thereon instructions that, in response to execution, cause a system comprising a processor to perform operations, the operations comprising:
rendering an interactive virtual reality (VR) presentation of an industrial facility based on a digital model of the industrial facility;
receiving manual interaction data representing manual interactions with the VR presentation of the industrial facility, wherein the manual interactions are indicative of design specifications for an industrial automation system and comprise at least one of a manual interaction defining placement of an industrial asset at a specified location within the VR presentation, a manual interaction defining a relocation of an industrial asset from a first location within the VR presentation to a second location within the VR presentation, a manual interaction defining replication of an industrial asset across multiple locations within the VR presentation, a manual interaction defining a trajectory to be carried out by a motion device, or a manual interaction defining a path through which material is to be transferred;
translating the interaction data into system project data that satisfies the design specifications represented by the manual interactions, wherein the translating comprises translating the interaction data to at least an executable industrial control program configured to perform control of the industrial automation system; and
performing simulated control of the industrial automation system by the industrial control program based on exchange of virtual I/O data between the industrial control program and the digital model.

17. The non-transitory computer-readable medium of claim 16, wherein the rendering comprises selectively rendering the VR presentation as either of a first-person view that simulates the wearer's presence within the industrial facility and an external view that renders a down-scaled model view of the industrial facility.

18. The non-transitory computer-readable medium of claim 16, wherein the translating further comprises translating the interaction data to at least one of an industrial visualization application configured to visualize at least a portion of the industrial automation system, industrial device configuration data configured to set a configuration parameter of an industrial device, an engineering drawing, a wiring schedule, or a bill of materials.

19. The non-transitory computer-readable medium of claim 16, wherein the performing of the simulated control comprises determining whether the industrial control program satisfies the design input based on a result of the simulated control.

20. The non-transitory computer-readable medium of claim 16, wherein the digital model models physical appearances of industrial assets that make up the industrial automation system and behaviors of the industrial assets in response to control inputs from an industrial controller.

* * * * *